United States Patent  (10) Patent No.: US 12,073,438 B2
Gerber et al.  (45) Date of Patent: Aug. 27, 2024

(54) CONSUMER SENTIMENT ANALYSIS FOR SELECTION OF CREATIVE ELEMENTS

(71) Applicant: Zeta Global Corp., New York, NY (US)

(72) Inventors: Steven Gerber, New York, NY (US); Pavan Korada, San Mateo, CA (US); David Schey, New York, NY (US); Sunpreet Khanuja, San Mateo, CA (US); Gayan De Silva, Prague (CZ)

(73) Assignee: Zeta Global Corp., New York, NY (US)

( * ) Notice: Subject to any disclaimer, the term of this patent is extended or adjusted under 35 U.S.C. 154(b) by 55 days.

(21) Appl. No.: 17/735,093

(22) Filed: May 2, 2022

(65) Prior Publication Data

US 2022/0351252 A1 Nov. 3, 2022

Related U.S. Application Data

(60) Provisional application No. 63/182,553, filed on Apr. 30, 2021.

(51) Int. Cl.
*G06Q 30/0251* (2023.01)
*G06Q 30/0201* (2023.01)
*G06Q 30/0204* (2023.01)
*G06Q 30/0241* (2023.01)

(52) U.S. Cl.
CPC ..... *G06Q 30/0269* (2013.01); *G06Q 30/0201* (2013.01); *G06Q 30/0205* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 9,892,431 B1 * | 2/2018 | Agrawal | G06Q 30/0242 |
| 10,692,114 B1 * | 6/2020 | Andersen | G06Q 30/0275 |
| 2013/0282430 A1 * | 10/2013 | Kannan | G06Q 30/02 705/7.29 |
| 2017/0032280 A1 * | 2/2017 | Socher | G06N 3/044 |

OTHER PUBLICATIONS

Dmoshinskaia ("Dropout prediction in MOOCs: using sentiment analysis of users' comments to predict engagement." MS thesis. University of Twente, 2016) (Year: 2016).*

* cited by examiner

*Primary Examiner* — Christopher B Tokarczyk
(74) *Attorney, Agent, or Firm* — Schwegman Lundberg & Woessner, P.A.

(57) ABSTRACT

The subject technology predicts consumer sentiment based on demographics and other statics features of the consumer as well as dynamic features generated based on engagement of the consumer with previously presented targeted content. The sentiment predictions are used to recommend and generated new targeted content that is published to the consumer.

20 Claims, 12 Drawing Sheets

CONSUMER SENTIMENT ANALYSIS FOR SELECTION OF CREATIVE ELEMENTS

CLAIM OF PRIORITY

This patent application claims the benefit of priority, under 35 U.S.C. Section 919(e), to Korada et al, U.S. Provisional Patent Application Ser. No. 63/182,553, entitled "SYSTEM AND METHOD OF PREDICTING SENTIMENT SCORES FOR CONSUMERS," filed on Apr. 30, 2021, which is hereby incorporated by reference herein in its entirety.

TECHNICAL FIELD

The subject matter disclosed herein generally relates to the technical field of (online) conversion, visitor profiling, and visitor segmenting. More particularly, the disclosure relates the technical field of predicting behavior that can result in conversion online, and that of customizing the content of distributed messages to the particular interest of an individual consumer and the sentiments of that consumer.

BACKGROUND

As more environments, including digital environments, are becoming more complex, individuals are turning towards various forms of technology for assistance. The same is true for the digital marketing environment. All types of technology support are utilized in the various areas of digital marketing, including, but not limited to, search marketing, display marketing, online advertisement, lead generation, voucher distribution, content personalization and the like. However, there is not a single technology designated to operate across the various areas of digital marketing in order to assist individuals to reach intelligent decisions in order to increase a predefined action (e.g., conversion, downloads, and the like). Therefore, there is a need for a system or method to predict the probability of a particular consumer performing a certain action using a score-driven approach.

BRIEF DESCRIPTION OF THE DRAWINGS

Some embodiments are illustrated by way of example and not limitation in the figures of the accompanying drawings.

DETAILED DESCRIPTION

Figure 1:
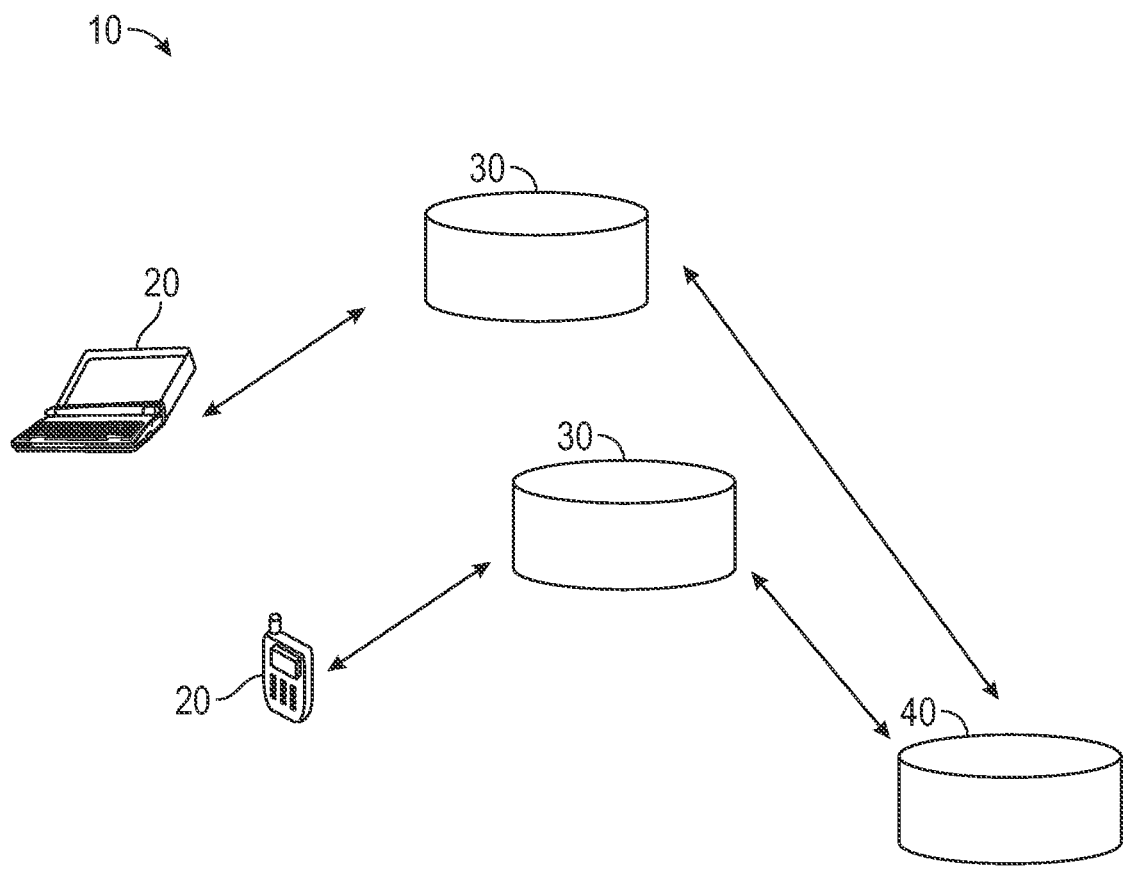
FIG. 1 is a schematic representation of a scoring probability system, according to various embodiments of the present disclosure.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described herein are systems and methods for consumer sentiment analysis for real time selection of creative elements. In various embodiments, the system may determine the probability of a particular consumer converting (i.e., making a purchase), clicking a piece of actionable content, or committing a certain action based on static features and/or dynamic features associated with the consumer. The dynamic features may be derived from one or more exposure windows that occurred during a defined exposure period. The exposure windows may include an instance where a consumer was presented with a piece of targeted content and impression data recording any engagement (e.g., displays, views, clicks, conversions, and the like) with the targeted content by the consumer.

The system may also determine the probability of a particular consumer performing a certain action based on scores for various sentiments. In an aspect, the scores can represent the probability of particular sentiment causing the individual to perform an action. In another aspect, the score can be identified as, but not limited to, an engagement score, measuring the level of interest in a particular sentiment. In an aspect, the score-based system can be used to segment and target visitors for lead generation, to adjust bids in real-time bidding (RTB), to select creative elements to incorporate in personalized content on websites, emails and other messages, to measure, evaluate and optimize (online) media campaigns, and bidding strategies, to send push notifications to online visitors, to enrich external environments (like CRM systems) with profile data.

In an aspect, the system can utilize an automated process configured to happen in real-time on a visitor individual level. In an aspect, the system can be used to measure, analyze and evaluate the consumer engagement on a website based on different sentiments. These metrics can be used to optimize media budgets towards brand engagement and conversion probability.

These and other objects and advantages of the invention will become apparent from the following detailed description of the preferred embodiments of the disclosure.

Both the foregoing general description and the following detailed description are exemplary and explanatory only and are intended to provide further explanation of the embodiments described herein. The accompanying drawings are included to provide a further understanding of the invention and are incorporated in and constitute part of this specification, illustrate several embodiments of the invention, and together with the description serve to explain the principles of the invention.

The present invention will now be described more fully hereinafter with reference to the accompanying drawings, which are intended to be read in conjunction with this detailed description, the summary, and any preferred and/or particular embodiments specifically discussed or otherwise disclosed. This invention may, however, be embodied in many different forms and should not be construed as limited to the embodiments set forth herein. Instead, these embodiments are provided by way of illustration only and so that this disclosure will be thorough, complete and will fully convey the full scope of the disclosed embodiments to those skilled in the art.

As used in the specification and the appended claims, the singular forms "a." "an" and "the" include plural referents unless the context clearly dictates otherwise. Ranges may be expressed herein as from "about" one particular value. and/or to "about"' another particular value. When such a range is expressed, another embodiment includes from the one particular value and/or to the other particular value. Similarly, when values are expressed as approximations, by use of the antecedent "about" it will be understood that the particular value forms another embodiment. It will be further understood that the endpoints of each of the ranges are significant both in relation to the other endpoint, and independently of the other endpoint "Optional" or "optionally" means that the subsequently described event or circumstance may or may not occur, and that the description includes instances where said event or circumstance occurs and instances where it does not Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions. groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. In addition, the present methods and systems may be implemented by centrally located servers, remote located servers, or cloud services. Any suitable computer-readable storage medium may be utilized including hard disks, CO-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, computers and components found in cloud services, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner. such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems that have been introduced above, and discussed in further detail below, have been and will be described as comprised of units. One skilled in the art will appreciate that this is a functional description and that the respective functions can be performed by software, hardware, or a combination of software and hardware, A unit can be software, hardware, or a combination of software and hardware. In one exemplary aspect, the units can comprise a computer. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

FIG. 1 illustrates a scoring probability system 10 according to an aspect of the present invention. As shown in FIG. 1, the scoring probability system 10 includes a plurality of internet enabled devices 20 that are configured for use by various different consumers. The internet enabled devices 20 can communicate with various vendor servers 30. The vendor servers 30 can communicate with a scoring probability server 40. The vendor servers 30, based upon information related to the consumer of the internet enabled device 20, calls upon the scoring probability server 40 to predict whether or not the consumer of the internet enabled device 20 will perform a certain action or not as discussed in more detail below.

Figure 2:
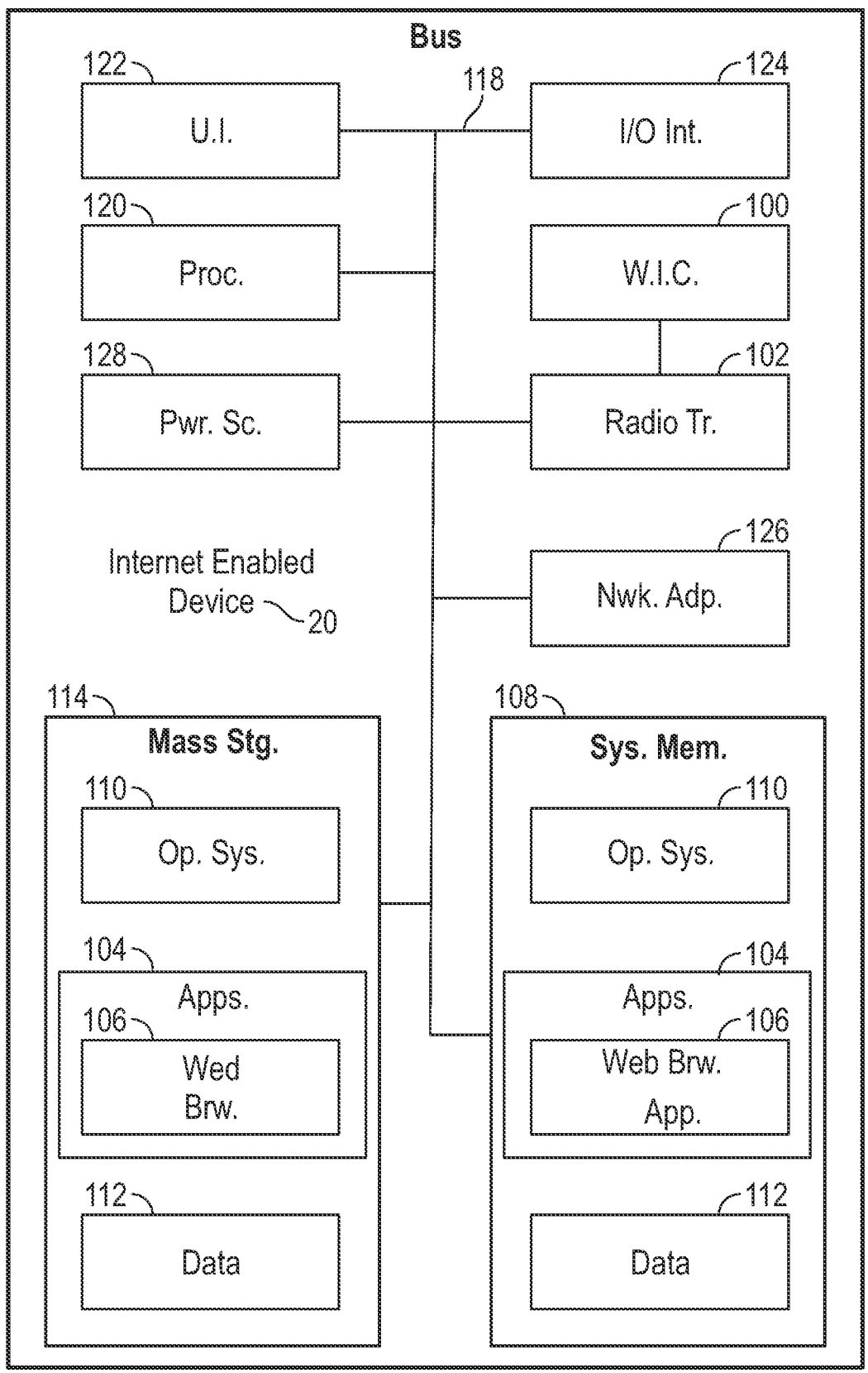
FIG. 2 is a block diagram of an internet enabled device of the system of FIG. 1, according to various embodiments of the present disclosure.

The internet enabled devices 20 can include, but are not limited to, laptop computers, tablets, smart phones. PDA's, handheld computers, and the like. According to an aspect, as shown in FIG. 2, the internet enabled devices 20 include a combination wireless interface controller 100 and radio transceiver 102. The wireless interface controller ("W.I. Cont.") 100 is configured to control the operation of the radio transceiver 102, including the connections of the radio transceiver 102, as well as the receiving and sending of information from the vendor servers 30 and scoring probability server 40.

The radio transceiver 102 may communicate on a wide range of public frequencies, including, but not limited to, frequency bands 2.4 GHz and/or 5 GHz-5.8 GHz. In addition, the radio transceiver 102, with the assistance of the wireless interface controller 100, may also utilize a variety or public protocols. For example, in various embodiments, the combination wireless interface controller 100 and radio transceiver 102 may operate on various existing and proposed IEEE wireless protocols, including, but not limited to, IEEE 802.ii b/g/n/a/ac, with maximum theoretical data transfer rates/throughput of 11 Mbps, 54 Mbps, 600 Mbps, 54, MBps, 1 GBps, and the like respectively. In an aspect, the radio transceiver 102 can include a wireless cellular modem 102 configured to communicate on cellular networks. The cellular networks can include, but are not limited to, GPRS, GSM, UMTS, EDGE, HSPA, CDMA2000, EVDO Rev 0, EVDO Rev A, HSPA+, and WiMAX, LTE.

In an aspect, the internet enabled devices 20 are configured to communicate with other devices over various networks. In an aspect, the internet enabled devices 20 operates in a networked environment using logical connections, including, but not limited to, local area network (LAN) and a general wide area network (WAN), and the internet. Such network connections can be through a network adapter 126. A network adapter 126 can be implemented in both wired and wireless environments. Such networking environments are conventional and commonplace in offices, enterprise-wide computer networks, intranets, cellular networks and the Internet.

The internet enabled devices 20 may have one or more software applications 104, including a web browser application 106. The internet enabled device 20 includes system memory 108, which can store the various applications 104, including the web browser application 106, as well as the operating system 110. The system memory 108 may also include data 112 accessible by the various software applications. The system memory 108 can include random access memory (RAM) or read only memory (ROM). Data 112 stored on the internet enabled device 20 may be any type of retrievable data. The data may be stored in a wide variety of databases, including relational databases, including, but not limited to, Microsoft Access and SQL Server, MySQL, INGRES.DB2. INFORMIX, Oracle, PostgreSQL, Sybase 11, Linux data storage means, and the like.

The internet enabled device 20 can include a variety of other computer readable media, including a storage device 114. The storage device 114 can be used for storing computer code. computer readable instructions, program modules. and other data 112 for the internet enabled device 20, and the storage device 114 can be used to back up or alternatively to run the operating system 110 and/or other applications 104, including the web browser application 106. The storage device 114 may include a hard disk, various magnetic storage devices such as magnetic cassettes or disks, solid-state flash drives, or other optical storage, random access memories, and the like.

The internet enabled device 20 may include a system bus 118 that connects various components of the internet enabled device 20 to the system memory 108 and to the storage device 114, as well as to each other. Other components of the internet enabled device 20 may include one or more processors or processing units 120, a user interface 122, and one or more input/output interfaces 124. In addition, the internet enabled device 20 includes a network adapter 126. In addition, the internet enabled device 20 can include a power source 128, including, but not limited to, a battery or an external power source.

Figure 3:
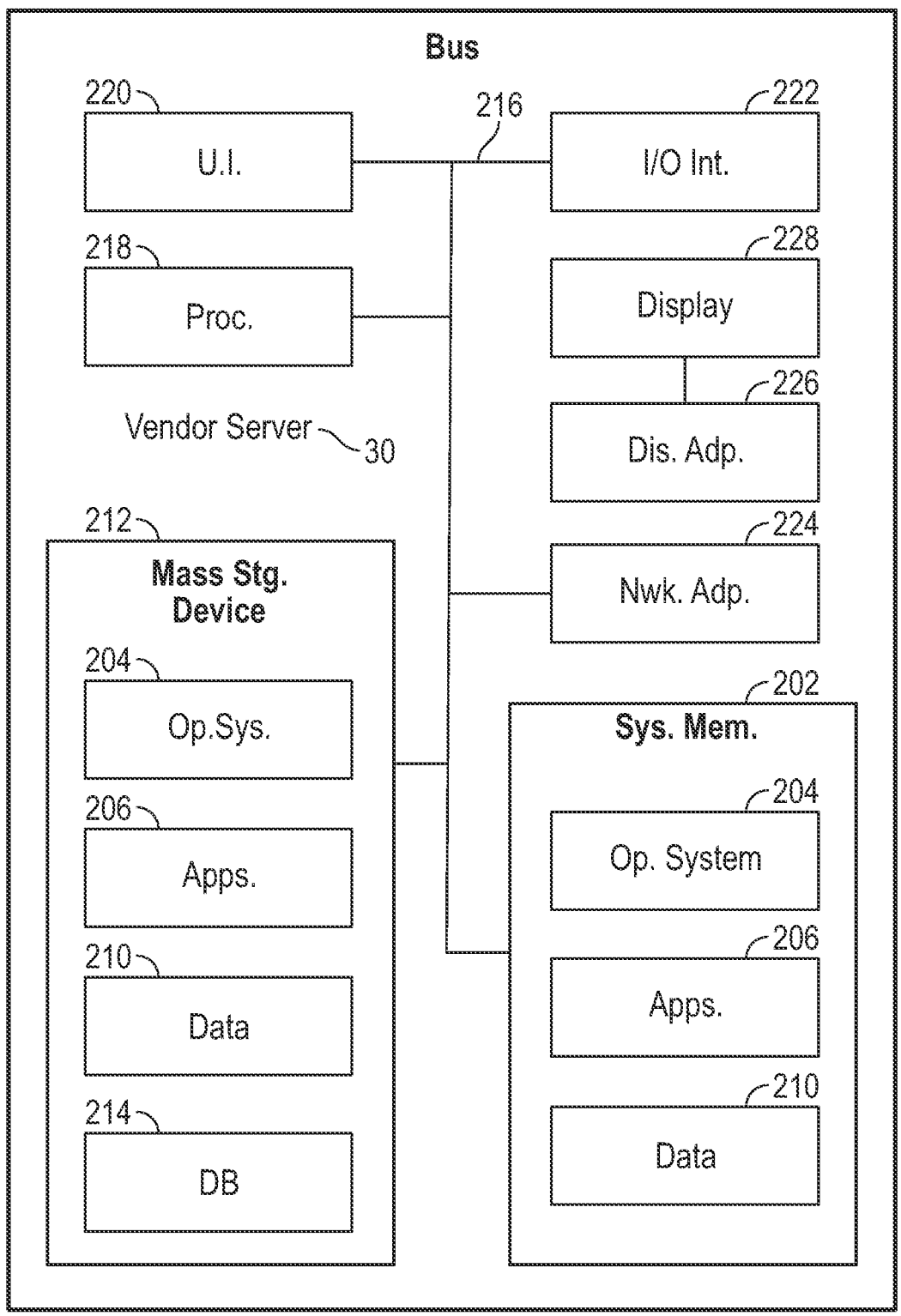
FIG. 3 is a block diagram of the vendor server of FIG. 1, according to various embodiments of the present disclosure.

As shown in FIG. 3, the vendor servers 30 can include system memory 202, which stores the operating system 204 and various software applications 206. The vendor servers 30 may also include data 210 that is accessible by the software applications 206. The vendor servers 30 may include a mass storage device 212. The mass storage device 212 can be used for storing computer code, computer readable instructions, program modules, various databases 214, and other data for the vendor servers 30. The mass storage device 212 can be used to back up or alternatively to run the operating system 204 and/or other software applications 206. The mass storage device 212 may include a hard disk, various magnetic storage devices such as magnetic cassettes or disks, solid slate-flash drives, CD-ROM, DVDs or other optical storage, random access memories, and the like.

The vendor servers 30 may include a system bus 216 that connects various components of the vendor servers 30 to the system memory 202 and to the mass storage device 212, as well as to each other. In an aspect, the mass storage device 212 can be found on the same vendor server 30. In another aspect, the mass storage device 212 can comprise multiple mass storage devices 212 that are found separate from the vendor server 30. However, in such aspects, the vendor servers 30 can be provided access.

Other components of the vendor servers 30 may include one or more processors or processing units 218, a user interface 220, an input/output interface 222. and a network adapter 224 that is configured to communicate with other devices, including, but not limited to, servers associated with recommendation tracking systems (discussed in more detail below), internet enabled devices 20, other servers, and the like. The network adapter 224 can communicate over various networks. In addition, the vendor servers 30 may include a display adapter 226 that communicates with a display device 228, such as, a computer monitor and other devices that present images and text in various formats. A system administrator can interact with the vendor servers 30 through one or more input devices (not shown), which include, but are not limited to, a keyboard, a mouse, a touchscreen, a microphone, a scanner, a joystick, and the like, via the user interface 220.

Figure 4:
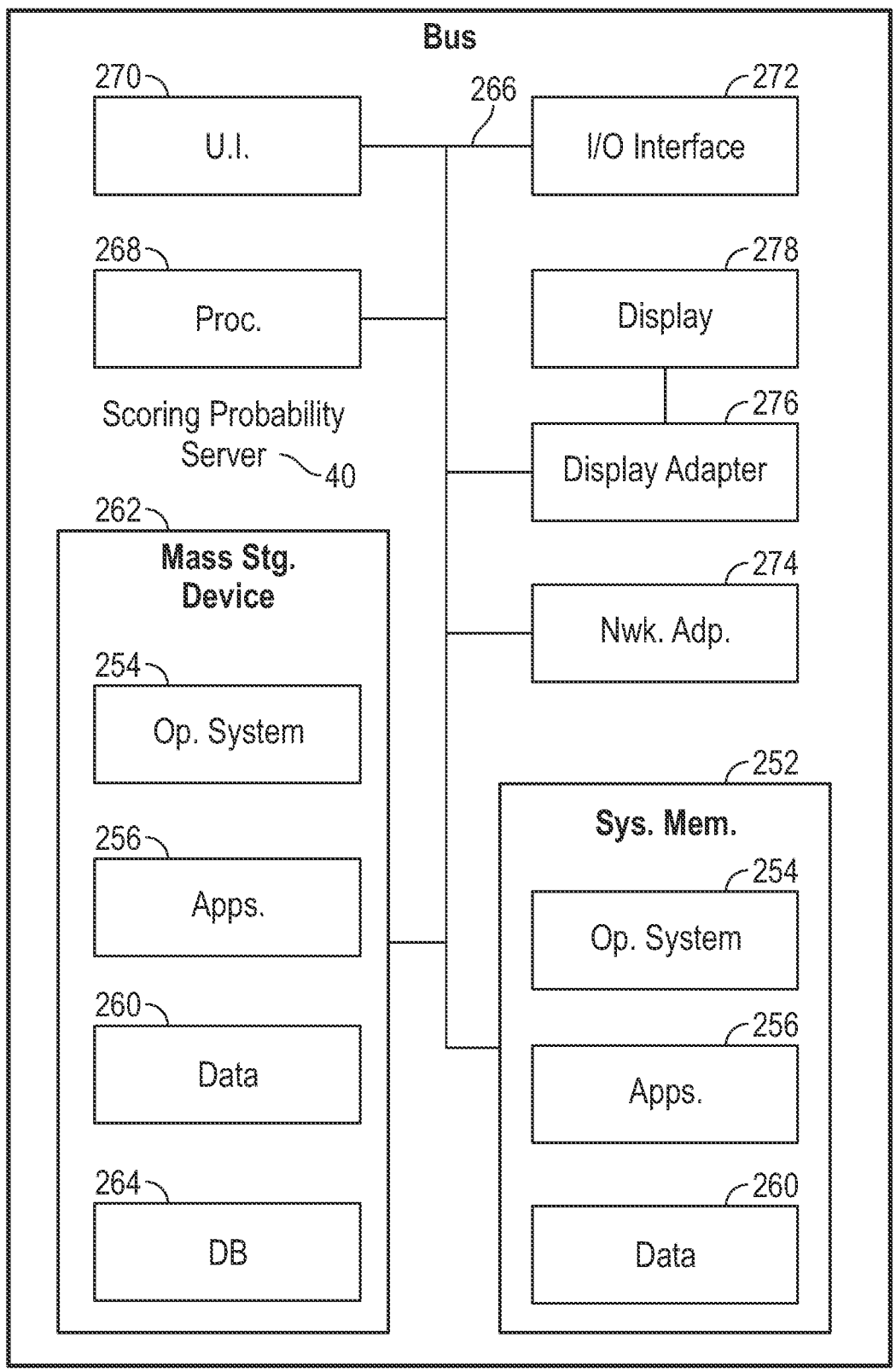
FIG. 4 is a block diagram of the scoring probability server of FIG. 1, according to various embodiments of the present disclosure.

FIG. 4 illustrates a scoring probability server 40 according to an aspect. The scoring probability server 40 may have several applications 256, discussed in more detail below. In general, the probability scoring server 40 and its applications 256 may utilize elements and/or modules of several nodes or servers. In any event, the scoring probability server 40 should be construed as inclusive of multiple modules, software applications, servers and other components that are separate from the internet enabled devices 20 and the vendor servers 30.

The scoring probability server 40 can include system memory 252, which stores the operating system 254 and various software applications 256. The scoring probability server 40 may also include data 260 that is accessible by the software applications 256. The scoring probability server 40 may include a mass storage device 252. The mass storage device 262 can be used for storing computer code, computer readable instructions, program modules, various databases 264, and other data for the scoring probability server 40. The mass storage device 262 can be used to back up or alternatively to run the operating system 254 and/or other software applications 256. The mass storage device 262 may include a hard disk, various magnetic storage devices such as magnetic cassettes or disks, solid state-flash drives, CD-ROM, DVDs or other optical storage, random access memories, and the like.

In various embodiments, an identity graph, data cloud, or one or more other databases 264 may be implemented using the mass storage device 262. The data cloud may include consumer identity profiles, or one or more other datasets associated with the consumers. The consumer identity profiles may include one or more static features and one or more dynamic features for each consumer. The static features may include location data (e.g., a zip code, street address, or other known geographic location for the consumer) and one or more intender attributes. The intender attributes may include individual metrics that may be used to determine an intent of a consumer to purchase a product, visit a store, view an ad, or perform another action. For example, the intender attributes may include demographic information (e.g., age, gender, race, ethnicity, sexual orientation, education, household size, and the like), financial information (e.g., income, credit score, type of residence, and the like), one or more interests of the consumer, and other consumer data. The intender attributes included in the static features may also include individual level brand propensities (e.g., a tendency of the consumer to shop at store of a particular brand, purchase a particular brand of athletic shoes or other goods, consume content on YouTube or another particular media publisher by a particular band, and the like), brand affinity scores (e.g., metrics that describe how frequency and/or consistently consumers engage with particular brands, for example, how often consumers purchase products made by the brand, click or view ad or emails send by the brand, visit particular brand website, and the like), product propensities (e.g., the types of products or services consumers frequently and/or consistently buy or show interest in), and the like. The intender attributes may also include semantic codes (e.g., key words or important terms) summarizing the content of web pages and other digital media browsed by consumers. The intender attributes may also include an attitude or behavioral propensity (e.g., materialistic, athletic, health conscious, frugal, aggressive, or other personality trait) or a channel propensity (e.g., email, web page display, mobile ad, connected tv media, or other marketing channel preferred by a consumer).

The identity profiles may also include one or more dynamic features that may be determined by the profiling and scoring application 208 or other component of the scoring probability server. The dynamic features may be determined for each consumer in real time (i.e., within seconds for faster of recording the data used to determine the features) based on his or her past engagement behavior during an exposure time period (e.g., 3 days, 5 days, 10 days, 15 days, 20 days, 30 days, or any other period of interest). The dynamic features may be used to identity a current sentiment of the consumers based on the sentiment of the targeted content presented to the consumers and whether or not and how the consumers engaged with each piece of content during an exposure time period.

The scoring probability server 40 may resolve an identity for each of the consumers based on the one or more datasets stored in the data cloud. In various embodiments, the identity for each consumer may be resolved by matching one or more pieces of identification metadata with known identifiers for the consumer included in a consumer identity.

The scoring probability server 40 may include a system bus 266 that connects various components of the scoring probability server 40 to the system memory 252 and to the mass storage device 262, as well as to each other. In an aspect, the mass storage device 262 can be found on the same scoring probability server 40. In another aspect, the mass storage device 262 can comprise multiple mass storage devices 262 that are found separate from the scoring probability server 40. However, in such aspects the scoring probability server 40 can be provided access.

Other components of the scoring probability server 40 may include one or more processors or processing units 268, a user interface 270, an input/output interface 272, and a network adapter 274 that is configured to communicate with other devices, including, but not limited to, servers associated with the recommendation tracking system(s), discussed in more detail below, the internet enabled devices, other servers, and the like. The network adapter 274 can communicate over various networks. In addition, the servers may include a display adapter 276 that communicates with a display device 278, such as a computer monitor and other devices that present images and text in various formats. A system administrator can interact with the servers through one or more input devices (not shown), which include, but are not limited to a keyboard, a mouse, a touchscreen, a microphone, a scanner, a joystick, and the like, via the user interface 270.

Figure 5:
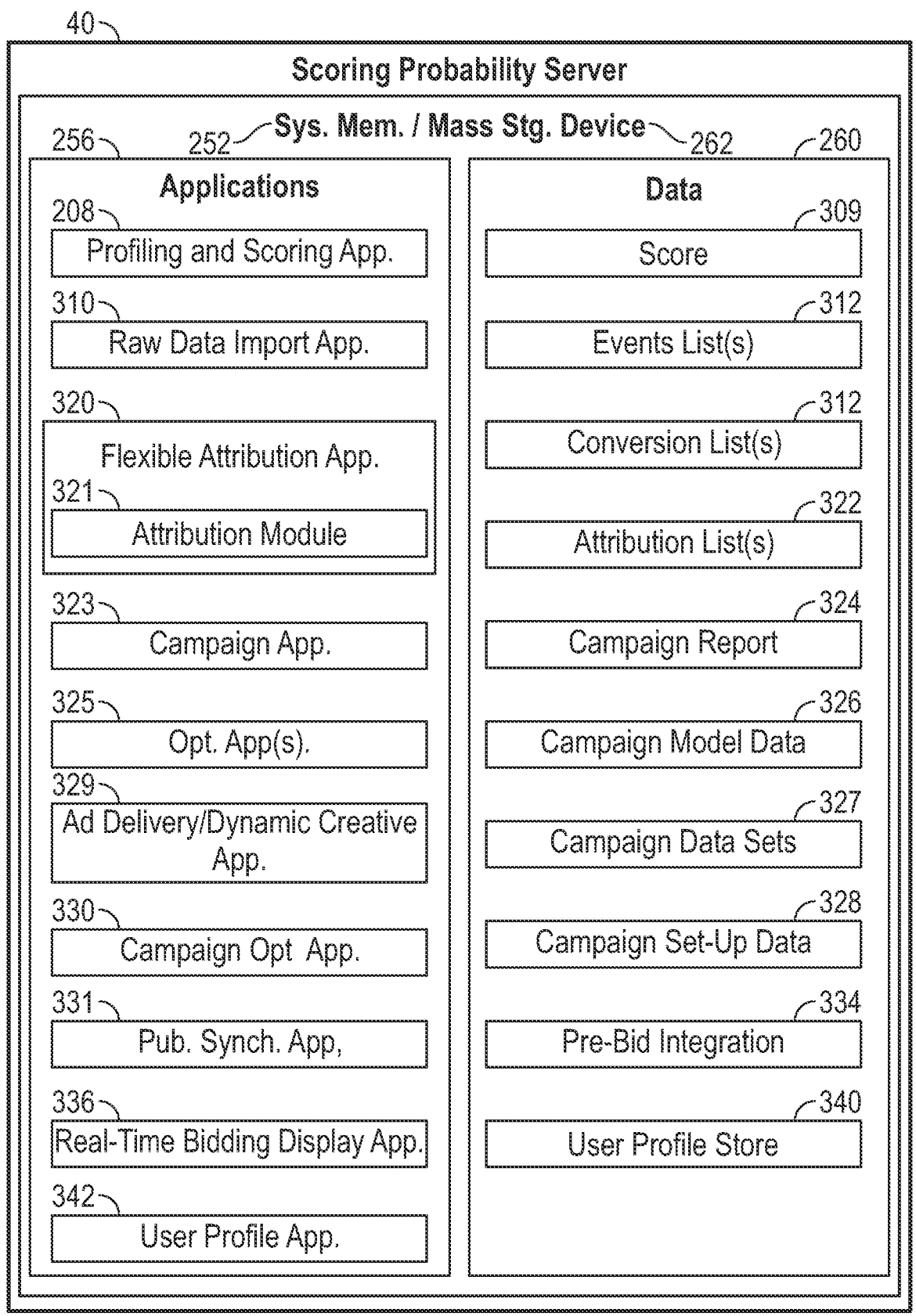
FIG. 5 is a block diagram of components of the scoring probability server of FIG. 4, according to various embodiments of the present disclosure.
Figure 6:
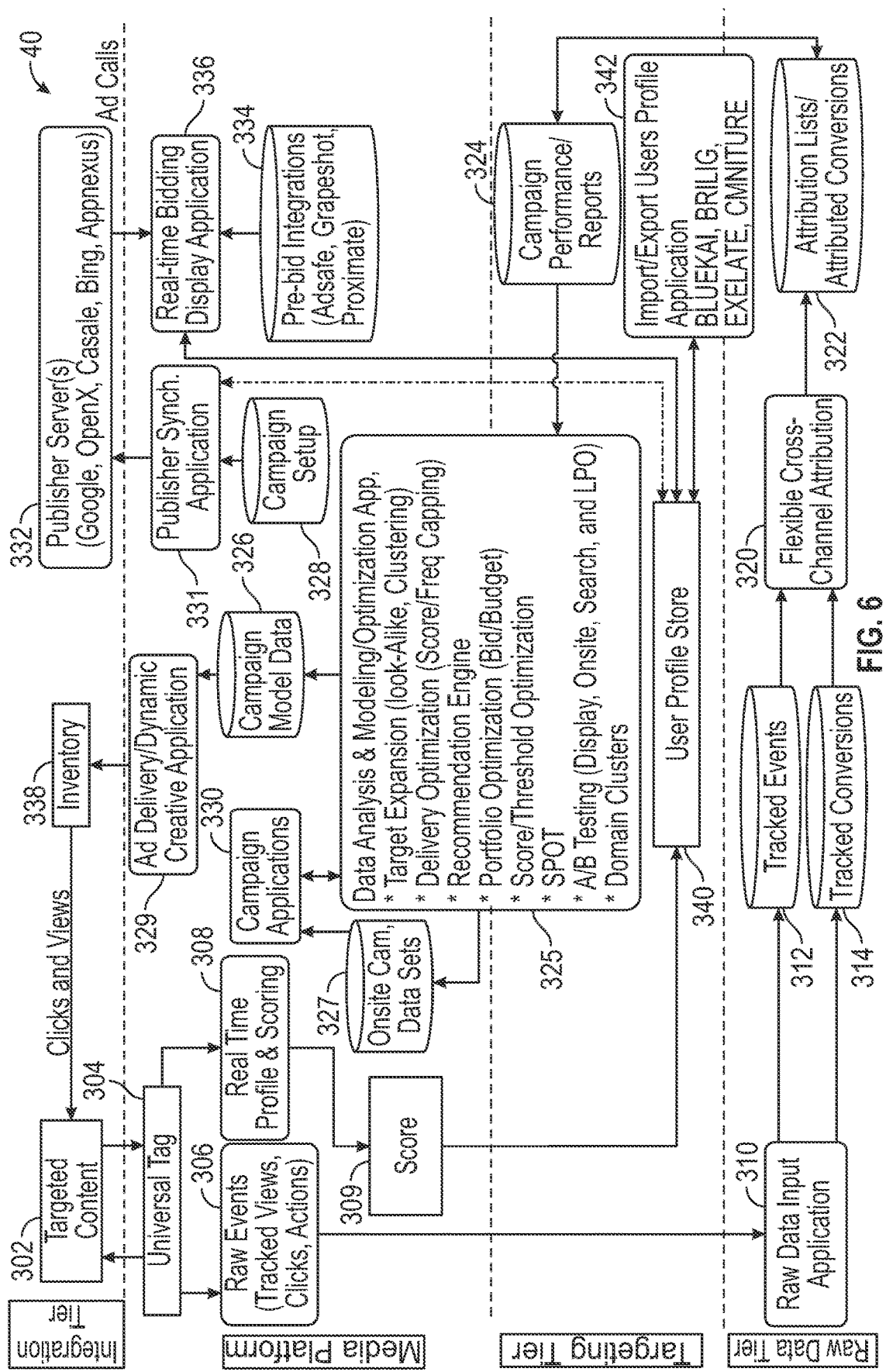
FIG. 6 is a schematic flow diagram of a method performed by the system of FIG. 1, according to various embodiments of the present disclosure.

FIGS. 5-6 illustrate the various applications of the scoring probability server 40 and the steps performed by the applications according to an aspect. The probability server 40 is configured to obtain data about particular consumers, associated with internet enabled devices 20, who are exposed to targeted content 302 (e.g., a display advertisement or other piece of advertising content displayed on a web page, an email, a video ad displayed on a video streaming platform, a mobile ad displayed in a mobile application, and the like). The targeted content 302 may be associated with a vendor server 30 and may be published on a publication network (e.g., the Internet). The targeted content may include one or more creative elements (e.g., an image, a piece of text, video, audio, multimedia content, and the like) and metadata. The metadata may include a universal tag 304 that may be generated by one or more tag generating modules and/or applications known in the art, which can be found on the vendor server 30 or the probability scoring vendor 40. In an aspect, the universal tag 304 is utilized to identify specific hosts of the targeted content and the various web pages or other publication channels associated with the targeted 302 (i.e., the channels where the targeted content was published). In an aspect, when activated, the universal tag 304 calls upon the various applications 256 of the scoring probability server 40 to enable the scoring probability server 40 to track the publication of the targeted content 302 and the interactions of consumers with the targeted content 302.

In various embodiments, the metadata may include one or more sentiment tags that tag the creative elements in a piece of targeted content with a sentiment based on the characteristics of the creative elements. Table 1 below illustrates a few examples of the sentiment tags described herein. It should be appreciated that the invention is not limited to the listed sentiment groups or contextual information and can be any type of trigger and any relevant contextual information to indicate that the creative has the associated trigger.

TABLE 1

| ID | Contextual Data | Acronym | Trigger |
|---|---|---|---|
| a | Cost conscious (Savvy savers, Deal-seekers | C | Cost/Savings/Budgetary |
| b | Lifestyle/Status-Seeking/Greed - If I make a decision now, I will be rewarded | L | Lifestyle/Status-Seeking/Greed |
| c | Risk/Safety/Fear (naturally normal) - make "safe" choices, as opposed to the safety category above which is driven by a product/feature/benefit that provides safety | R | Risk/Safety/Fear |
| d | Joy (sensory seekers) | J | Joy/Happiness |
| e | Social Consciousness/Altruism/Community (change agents) | S | Social Consciousness/Community |

Each sentiment tag may include an identifier (ID), contextual data, an acronym letter, and trigger information. For illustrative purposes, and as seen in Table, sentiments may be identified as letters a, b, c, d, etc. Each sentiment ID has contextual data that described the sentiment, acronym which is used to reference the sentiment in an ID for a piece of targeted content, and trigger which describes the consumer sentiments that trigger the presentation of creative elements tag with the particular sentiment. For example, a piece of targeted content having the creative ID: COMPANYACampaignID6_G-Q8-C3-M3-ZI-O_S_A_LTXT_030619 may include creative elements having sentiments associated with acronyms "S" and "A". Sentiment ID "e" has acronym "S" and is associated with triggers for social consciousness/community purposes. Accordingly, creative elements tagged with Sentiment ID "e" may indicate things to convey altruism or community support (e.g., a picture of a mother caring for her baby or text saying "giving back to the community"). Creative elements tagged with particular sentiment IDs will be included in targeted content that will be presented to consumers having sentiments that correspond to one of more of the triggers associated with the sentiments. For example, creative elements tagged with sentiment ID "e" will be presented to consumers having a social consciousness/community sentiment.

The sentiment tags may be added to creative elements manually and/or programmatically by a sentiment coder included in the ad delivery/dynamic creative application 329 or other component of the scoring probability server 40. In various embodiments the sentiment coder may include one or more natural language and or image processing algorithms that are used to parse creative elements, identity key features of the creative elements, classify the sentiment for each creative element. The sentiment classifications may be performed using one or more machine learning models including one or more network layers that are trained on a training dataset of creative elements having known contextual information and sentiment classifications. For example, network layers may include Recurrent Neural Network (RNN) units, Long Short-Term Memory (LSTM) units, Gated Recurrent units (GRU), and other neural network implementations.

The machine learning models may process the sentiment classifications, context information, and features of each creative element in the training dataset to learn how the sentiment of new creative elements should be determined. For example, if creative element that touts "save 50% now" is classified as having as cost/savings sentiment, a new creative that says "save 40% this weekend" may be classified as having a cost/savings sentiment by the sentiment coder. In various embodiments, the sentiment coder may determine the likelihood and degree that each new creative element is classified in each particular sentiment group. Accordingly, multiple sentiment tags may be applied to a creative element. For example, a creative element that has the highest probability of being classified as a cost-savings sentiment could be tags with a cost-savings sentiment tag. The same creative element could also be tagged with a luxury seeking sentiment tag if the classification probability for the luxury seeking sentiment meets or exceeds a probability threshold.

As described in more detail below, the profiling and scoring application 208 may determine a sentiment for each consumer included in a sample of individual consumers. The consumer sentiments generated by the profiling and scoring application 208 may include a likelihood the consumer will be triggered (e.g., click and advertisement, open an email, make a purchase, or perform any other desired outcome) by targeted content including creative elements having different sentiment classifications. In this way, the profiling and scoring application 208 determines the probability that a particular consumer is triggered by creative elements from each of the sentiment classifications. The profiling and scoring application 208 may provide the probabilities to a content recommendation component (i.e., the ad delivery/dynamic creative application 329) or publication system that determines the type of creative elements to include in a piece of targeted content that is presented to a particular consumer.

In an aspect, the scoring probability server 40 is configured to capture and track actions of the consumers of the internet enabled devices 20 who interact with the targeted content 302 (shown at step 306). For example, the scoring probability server 40 may capture impression data for each piece of targeted content presented to a consumer. The impression data may include displays, views, opens, clicks, purchases, and any other action performed to engage with the targeted content 302. The scoring probability server 40 is also configured to develop and maintain a score 309 for each consumer associated with the internet enabled devices for each client associated with the vendor server 30 (step 308). The score 309 is configured to indicate the probability that a consumer will carry out a specific action. For example, the score 309 can be used to indicate the propensity of the consumer to buy an item advertised by the vendor server 30, open an email, view a piece of targeted content, and the like. Other scores 309 that may be generated by the scoring probability server include, but are not limited to, a site/brand engagement score, a level of interest score, a conversion score, and/or a product interest score. The level of interest score may quantify the intensity of the consumer in general (product interest score), in a specific product (product interest score) or in a service. Multiple scores could be combined and stored in an identity profile for the consumer.

In an aspect, the scoring probability server 40 can utilize a real-time profiling and scoring application 208 to generate the score 309. In an aspect the real-time profiling and scoring application 208 is configured to parse out segment interests (i.e., measured activity in the aspect of interest), tie such segment interests to an individual (user of the internet enabled device 20) and maintain a score per segment identified for each client (i.e., vendor server 30), and maintain a consumer identity profile for the individual (user of the internet enabled device 20), including the score, as well as other client defined events, discussed in more detail below.

In an aspect, the scoring probability server 40 can be configured to record actions of consumers. In an aspect, the actions of the consumer can include raw events and raw conversions. The raw events, which can include, but are not limited to, the views, clicks, and other actions that are included in impression data described above. The scoring probability server 40 can be configured to collect the raw events (306) by a raw data import application 310, as shown in FIGS. 5 and 6.

The raw data import application 310 can be configured to monitor and/or record as impression data raw conversions, including, but not limited to, the submission of contact forms, subscription to programs and newsletters, the placement of (multiple) web orders, download of whitepapers and other items, and exposures and consumer responses to media (banners, search ads, emails, and the like) and conversion tools (as e.g. web forms, push content, and the like) from one or more vendor servers 30. In an aspect, the raw data import application 310 can capture the raw conversions as the conversions occur in real time. In an aspect, the raw data import application 310 can format the data 260 from the imported raw conversions for later utilization.

The scoring probability server 40 can then create comprehensive lists of all events (e.g., view and clicks) captured (312) as well as lists of all of the conversions (314) within the system 10. In an aspect, the raw data import application 310 can be configured to create the event lists (312) and conversion lists (314). These events (312) and conversions (314) can include all of those tracked by the scoring probability server 40, by the raw data import application 310 or other applications, as well as those from other sources that have been imported by the raw data import application 310. In an aspect, the raw data 260 can include, but is not limited to, sales conversion data from a customer relationship management (CRM) system.

In an aspect, the probability server 40 can be configured to utilize the events and conversions. In an aspect, a flexible attribution application 320 can utilize the lists of captured events 312 and conversions 314 to match specific events and conversions to one another in order to develop a sequence of events that led up to a conversion. In an aspect, the flexible attribution application 320 can also capture and associate with the sequence of events the time for each event. In an aspect. the segments generated, in combination with the sequence of the evens, can form couplets that show an interest within a category and the transition to another event/interest category. These transitions capture more information than single point estimates of category value by measuring two additional attributes: (1) the sustained within interest intensity of the consumer; and (2) the between interest variability and intensity of the consumer. The couplets are discussed in more detail below.

Figure 7:
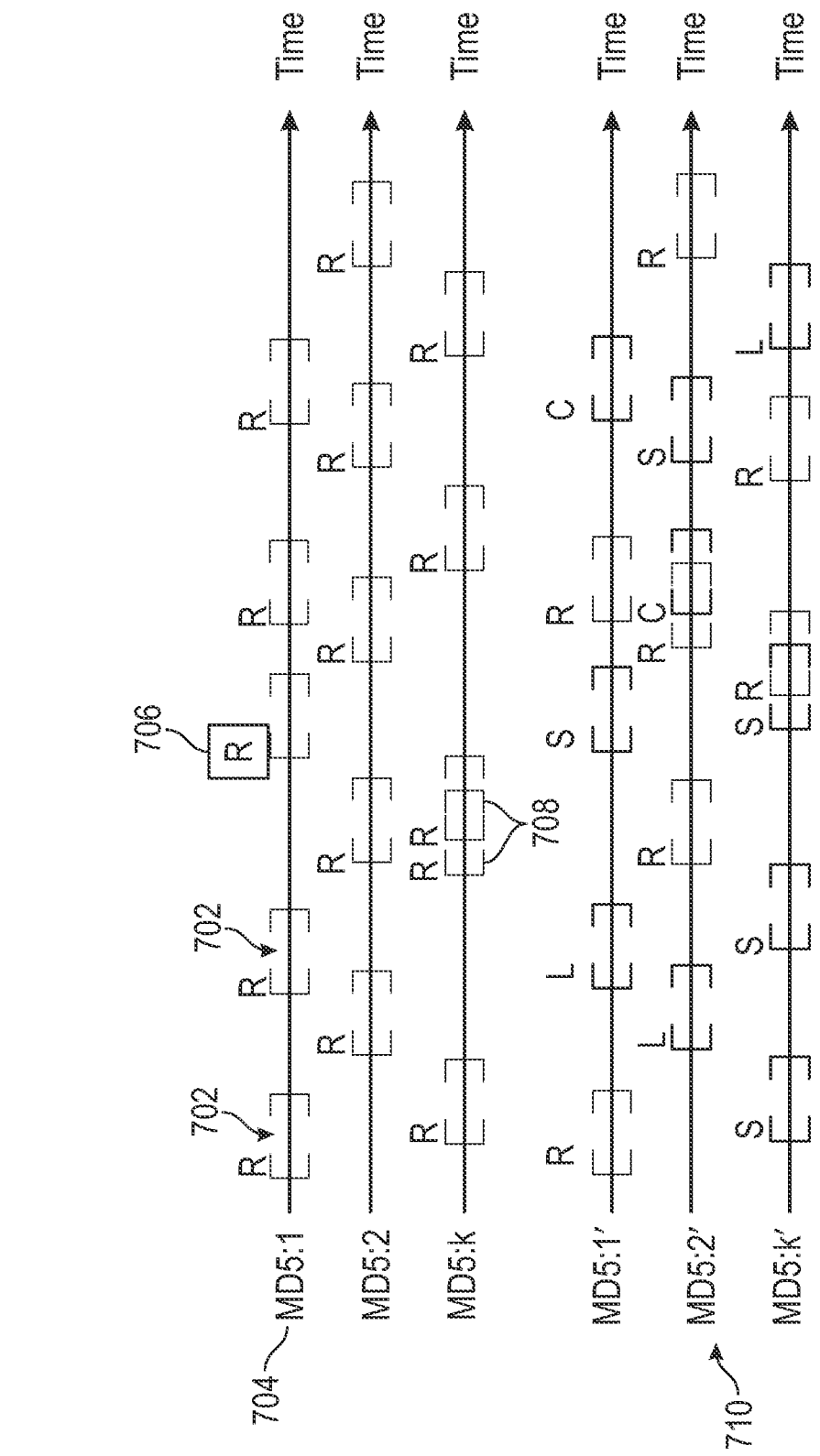
FIG. 7 illustrates a timeline including multiple exposure windows, according to various embodiments of the present disclosure.

In various embodiments, the probability server may determine the dynamic features for a sample of consumers based on the captured events 312 and conversions 314. For example, the profiling and scoring application 208 may extract the targeted content 302 presented to each consumer and the impression data recorded for each consumer in response to each piece of targeted content. The targeted content 302 and impression data may then be used to assemble one or more exposure windows for each consumer. FIG. 7 illustrates more details of the exposure windows. Each exposure window 702 includes an identifier for a piece of targeted content presented to a consumer 704 (e.g., MDR5:1, MDR5:2, MDR5:k, and the like are all individual consumers), the sentiment tags 706 (e.g., R, L, S, C, and the like are all different sentiment tags) for the creative elements included in the piece of targeted content, a digital timestamp recording the time the piece of targeted content was presented to the consumer, and other metadata associated with the targeted content, and an defined time period indicating the temporal length of the exposure window. The exposure windows 702 are mapped on a timeline in order to show a sequence of exposure windows for a consumer during a defined exposure time period (e.g., 30 days). Accordingly, the timelines in FIG. 7 show a different exposure window 702 for each piece of targeted content presented to the consumer and each exposure widow represents a defined time period that begins when the targeted content is presented to the consumer and ends 10 days later or some other time period in which consumers typically respond to the type of targeted content presented in the exposure window.

The exposure window also includes impression data recorded for the consumer during the defined period of time encapsulated in the window. The impression data for a sample of exposure widows (e.g., the last 10 window or all windows record in the last 30 days) may be used to derive the dynamic features shown below. The features may be calculated for each exposure window.

a. "lastSentimentSame"—may be a binary 1 yes, 0 no value indicating if the sentiment of the targeted content presented in the prior exposure window is the same as the current window b. "lastSentimentType": a categorical, L, R, S, C value indicating the sentiment of the targeted content present in the prior exposure window c. "last_3D_CampCount": an integer value indicating the number of campaigns targeting the consumer in the last 3 days (may be determined for other time periods e.g., in the last 5 days, 10 days, 20 days, 30 days, and the like)

d. "last_3D_ClickCount": an integer value indicating the number of clicks captured in impression data for the consumer in the last 3 days (may be determined for other time periods e.g., in the last 5 days, 10 days, 20 days, 30 days, and the like)

e. "last_3D_openCount": an integer value indicating the number of email opens captured in impression data for the consumer in the last 3 days (may be determined for other time periods e.g., in the last 5 days, 10 days, 20 days, 30 days, and the like, and may be determined for different actions including purchases, views, displays, and the like)

f. "last_Since_0104_CampCount": an integer value indicating the number of campaigns targeting the consumer since January 4 or any other date of interest g. "last_Since_0104_ClickCount": an integer value indicating the number of clicks captured in impression data for the consumer since January 4 or any other date of interest h. "last_Since_0104_openCount": an integer value indicating the number of email opens captured in impression data for the consumer since January 4 or any other date of interest (may be determined for different actions including purchases, views, displays, and the like).

The dynamic features described above may be combined with one or more static features to generated training datasets used to train a machine learning model that predicts a consumer sentiment (e.g., a sentiment prediction model). To determine the creative elements to including in targeted content that will be presented to a sample of consumers, the sentiment prediction model may determine each consumer's engagement probability with targeted content including creative elements having different sentiment tags. For example, the sentiment prediction model may determine the probability of each consumer opening an email including creative elements with "cost conscious", "status-seeking", "safe choices", "joy", and "social consciousness" sentiments respectively. The targeted content including creative elements with the sentiment that produced the highest engagement probability (e.g., the highest score for an email opening impression) will then be published to present the consumer with the targeted content that is most likely to trigger the desired engagement.

To train a sentiment prediction model, static features and dynamic features were determined for a sample of consumers that were targeted with at least one piece targeted content including a particular sentiment during a defined exposure time. The static features and dynamic features may be fitted into a supervised logic regression model that predicts a probability of a consumer opening an email or performing another engagement action based on the statics features and dynamic features of the consumers in the dataset. The sentiment prediction model may include as the dependent variable a binary indicator denoting the presence of an opening event for targeted content including creative elements of a particular sentiment. The independent variables may be the static and/or dynamic features. The sentiment prediction model may determine the probability of an email open or other event by determining which sentiment for the targeted content has the better Area Under the Curve (AUC) for the selected consumer. The larger the AUC the greater the probability consumer with open the email or otherwise engage with the targeted content. consumers will visit a brand location.

In various embodiments, a separate model may be created for each type of sentiment. Additionally, neural networks and other deep learning techniques may be used to train the sentiment prediction model. For example, a neural network including more or more network layers (e.g., RNN units, LSTM units, GRUs, and the like) that include trainable weights may be used to generate the consumer sentiment predictions. The network layers may encode the static features and/or dynamic features for each consumer to generate a feature vector. The feature vectors may then be mapped to a feature space based on the trained weights. To make a sentiment prediction, that static and dynamic features for a target consumer may be generated and mapped to the feature space to generate a value for a probability that the consumer will open an email or engage with targeted content including a particular sentiment. The predicted probability may be compared to a consumer's actual response rate to tune the model by re-enforcing accurate predictions and modifying the training weights in response to inaccurate predictions.

In various embodiments, the sentiment predictions generated by the sentiment prediction model may be back tested against known impression events. For example, if targeted content with one or more creative elements having an altruistic sentiment produces the greatest probability of a consumer engaging with the piece of targeted content (e.g., a 70% probability of opening an email or performing another engagement action), a consumer's known responses to targeted content with altruistic sentiments may be compared to the predicted probability. If the prediction probability is the same or similar to (e.g., within 1-10 percentage points) the consumer's actual engagement rate with targeted content having altruistic sentiments, the weights and other parameters of the sentiment model may be re-enforced in response to the accurate prediction. On the other hand, if the prediction probability is different from (e.g., more than 10 percentage points away) the consumer's actual engagement rate, the parameters of the regression model and or trainable weights of the neural network may be modified to improve the accurate of the predictions generated by the model.

To improve the accuracy of the sentiment prediction models, the exposure widows used to generate the dynamic features may be manipulated. For example, multiple exposure windows for each consumer in a sample by be generated by incorporating overlapping windows 708 in the training dataset. As shown in FIG. 7 overlapping windows are the result of multiple pieces of targeted content being presented to a consumer with the defined period of time for the window. For example, if 10 days is the defined period of time for each window, overlapping windows 708 would be observed when two or more pieces of targeted content were presented to the consumer during the 10 day period. Additionally, the exposure time sentiments of the targeted content presented to the consumers may be adjusted to further diversify the training dataset. For example, a training dataset the sentiment prediction model may include static and dynamic features for consumers targeted with content having only one type of sentiment. The training dataset may also include static and dynamic features for consumers targeted with multiple pieces of content having different types of sentiments. The training dataset may also include static and dynamic features for consumers having at least one overlapping window including two or more pieces of content having the same sentiment and consumers having at least one overlapping window include two or more pieces of content having different sentiments. The sentiment prediction model trained on a dataset including multiple and or all of these types of consumers will be exposed to more variations during the training process. The more diverse training dataset creates a model that has more stability across different consumers and content sentiment types and better performance (i.e., generates more accurate predictions than other models trained on simpler datasets.

To make the training process more efficient and enable the sentiment prediction model to be trained on exposure windows that are updated in real time, size of the training dataset may be reduced. For example, a reduced sample of exposure windows may be selected for a consumer and included in the training dataset. FIG. 7 illustrates a sample exposure windows 710 generated for customers using a random sampling technique. As shown, the exposure windows including a presentation of targeted content having a R type sentiment shown in the top three timelines for consumer samples MD5:1, MD5:2, and MD5:3 were randomly sampled to generated to the concatenated timelines for consumer sample MD5:1', MD5:2', and MD5:3'.

Referring back to FIG. 5, the flexible attribution application 320 can call upon attribution models to assist in the development of event sequences. In an aspect. the attribution models can be generated by modules 321 or the flexible attribution application 320 (shown in FIG. 5), applications on the scoring probability server 40, or model generating applications found connected to or in communication with the scoring probability server 40. The generation or event sequences can be done in order to determine the correct marketing channel (e.g., digital areas) from which the event originated in order to distribute credit to the correct channel (vendor server 30), as well as to determine ROI calculations.

In an aspect, the flexible attribution application 320 can be configured to generate attribution lists 322. Attribution lists 322 can be used for analyzing, evaluating and optimizing campaign performances. The attribution lists 322 can be merged with other datasets, including, but not limited to, campaign exposure (e.g., the information contained, used, and distributed with a particular advertisement campaign to which a given individual is exposed), advertising expenses, attributed revenue, and any other client-selected information to create a campaign report 324. In an aspect, a campaign application 323 can generate the campaign reports 324.

The campaign report 324 can be utilized to show the performance of a given campaign, as well as to feed optimization applications 325. The optimization applications can utilize various modules, algorithms, and methodologies. Such optimization modules, algorithms, and methodologies utilized by the optimization application 325 can include, but are not limited to, target expansion (look-a-like, clustering (i.e., target indirect audience with similar behavioral characteristics)), delivery optimization (score/frequency capping, i.e. the momentum and frequency of triggering interactions with a consumer), recommendation engines (i.e. product, service or content recommendations based on behavioral similarity with other consumers), portfolio optimization (bid/budget, e g. budget allocation to media campaigns based on the engagement score generated, and/or install consumer specific bidding thresholds on ad exchanges based on score), search portfolio optimization tools, A/B Testing (display, onsite, search and landing page optimization), and domain clusters (e.g., similarity grouping of URLs to be used for targeting). The campaign reports 324 and the output from the discussed optimization application 325 can be utilized by end-users of the system 10 (e.g., operators/system administrators of the vendor servers 30), and other systems to optimize media and marketing campaigns. The information from the campaign report 324, after processing by the optimization application 325, can be utilized to provide campaign model data 326, as well as provide specific campaign data sets 327. In an aspect, the optimization application 325 can be configured to generate campaign model 326 and specific campaign data sets 327.

In an aspect, the campaign model data 326 includes a set of optimization data normalized to pre-existing media campaigns to optimize delivery around the goals of a particular advertiser. As discussed above, the optimization application 325 can be configured to provide the optimization data in a normalized form. In an aspect, the campaign model data 326 can be utilized by an ad delivery/dynamic creative application 329 of the scoring probability vendor 40. The ad delivery application 329 can be configured to deliver creative tags (i.e., to increase the delivery of better performing copywriting and creatives) and links for display interaction impression (e.g., advertisements) won on a website or a publisher, or a client web site (i.e., hosted by a vendor server 30). In addition, the ad delivery application 329 can also be configured to deliver dynamic creative templates to map consumer interest to the advertiser's product inventory 338 (e.g., product list offered).

In an aspect, the specific campaign data set 327 can include specific configuration data for a given advertiser, including a list of hierarchical segments (a list of characteristics to monitor: e.g., a list of products, a list of possible actions on a website, a list of fields in a form that should be monitored, etc.), CRM configurations, lead generation forms and available campaign data for marketing efforts. The specific campaign data set 327 can be utilized by a campaign optimization application 330 for the delivery of marketing messages and lead generation, as shown in FIGS. 5 and 6. The campaign optimization application 330 can be utilized by outside sources, including, but not limited to, the vendor servers 30.

In an aspect, the scoring probability server 40 can be configured to utilize campaign setup data 328. The campaign setup data 328 can include hierarchical campaign structure data which maps to each vendor sever 30 utilizing the scoring probability server 40. The campaign setup data 328 can be utilized by a publisher synchronization application 331, as shown in FIGS. 5 and 6. The synchronization application 331 can be configured to leverage API libraries of a publisher server 332 (i.e., publishing server that lead to the event at the vendor server 30) to replicate, manipulate, and maintain campaign structures between publishers 332 (i.e., search engines, media and social applications) and the scoring probability server 40.

Once the mapping and scoring are done, the scoring probability server 40 can then provide a score and corresponding sentiment/content. For example, if the scoring probability server 40 is being utilized by an automotive company, the scoring probability server will provide the optimal sentiment to provide corresponding advertisements. If a targeted consumer has the highest probability score for "budget conscience," the automotive company can send advertisements to the consumer that show mark-downs or big sales events. Alternatively, if the scoring probability server indicates that the target consumer has the highest score for social conscience causes, the automotive company could use creative that highlights their efforts on a cause (such as corporate charity, equitable management and the like) or benefits or the car (such as reduced carbon footprint in manufacturing). Indeed. the same message can be more effectively communicated to a target consumer based on their optimized sentiment efficient gas mileage can be touted as cost reduction (for budget conscience) and better for the environment (for social conscientious).

Figure 8:
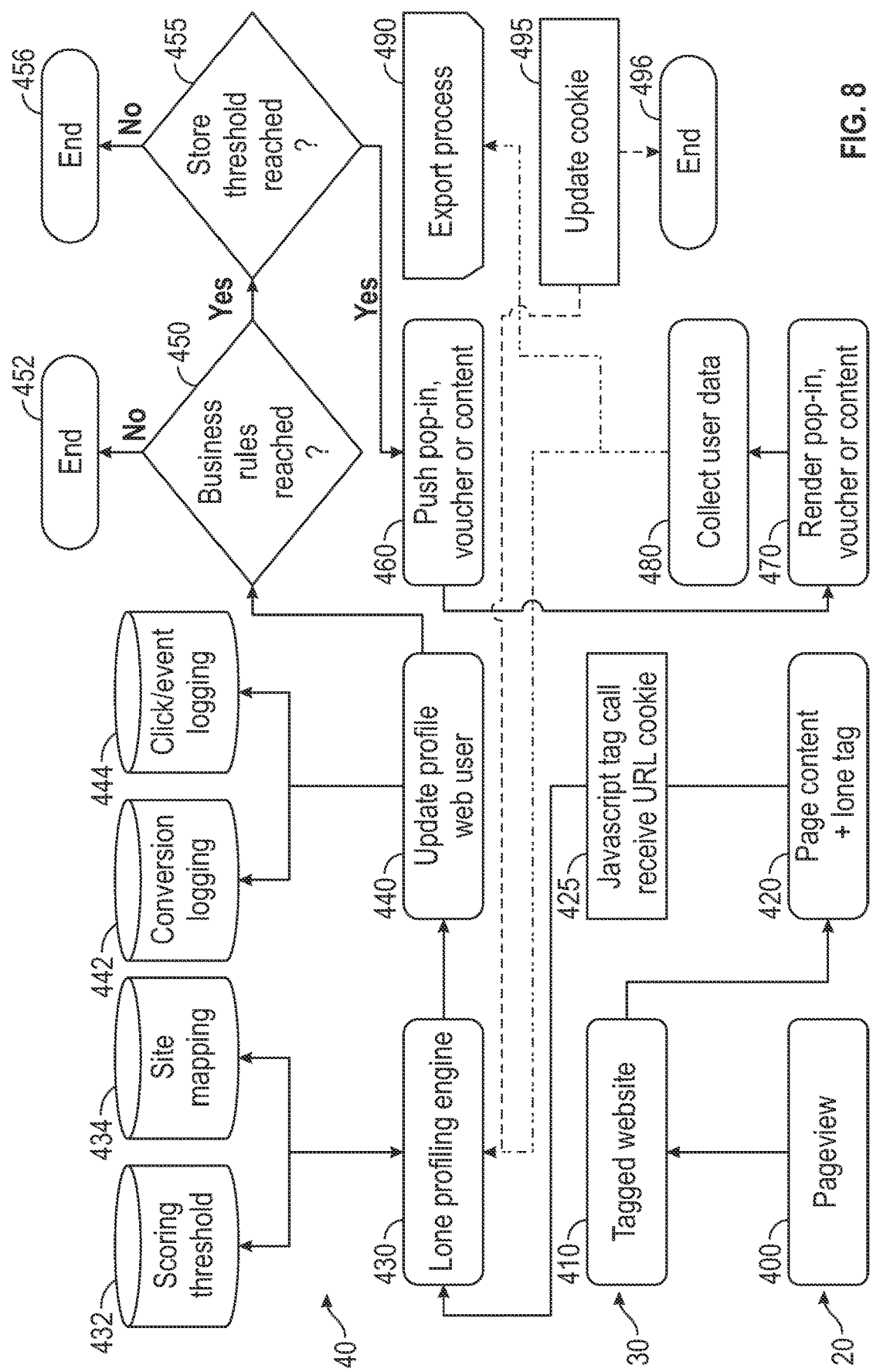
FIG. 8 is a flow diagram of a method performed by the system of FIG. 1, according to various embodiments of the present disclosure.

FIG. 8 illustrates a method performed by the scoring probability server 40 of the scoring probability system 10 according to an aspect. A consumer (via the internet enabled device 20) initiates the web browser application 108 to visit a webpage (step 400). The consumer will then come across a tagged website associated with a vendor server 30 that utilizes the scoring probability server 40 (step 410). When the tagged site is visited, the site through the vendor server 30 will deliver content of the page to the consumer together with the execution of the tag (step 420). The tagged website can include code (e.g., JavaScript) that, when executed (i.e., selected by the consumer), can send details of the page view, details above the visitor session, and cookies to the scoring probability server 40 (step 425). The consumer information can be utilized by the scoring probability server 40, and more specifically, the real-time profiling and scoring application 208 (step 430) to analyze the received data and generate a score in real time, discussed in more detail below.

Once a score has been generated, the scoring probability server 40 can compare the score to a scoring threshold (432). In an aspect, the profiling and scoring application 208 can compare the score to the scoring threshold or call upon other applications to do the comparison. The scoring threshold is a predefined score. In an aspect, the scoring threshold is an eligibility check, which can be determined by pre-defined algorithms or set by account managers in order to control exposure. In another aspect, the scoring threshold is a goal that indicates whether people above that threshold will perform a given action (e.g., convert, buy, fill-in, click, etc.).

In an aspect, the scoring probability server 40 can also perform site mapping (step 434), wherein the site is segmented into logical areas. In an aspect, the scoring probability server 40 can call upon a mapping application to create the mapping. In another aspect, the profiling and scoring application 208 can perform the mapping. In an aspect, the mapping includes creating a logical area around a particular area on a webpage of the website. A logical area can be around a certain product or destination. In another aspect, a logical area can be around a certain consumer action (starting a funnel, using parts of a car configurator tool, looking for a dealer, looking at a gallery page). In an aspect, all physical URLs are then rolled up to that map. The site mapping 434 can include segmenting the structure of a website (URL) based on logical business groups.

Once the mapping and scoring are done, the scoring probability server 40 can then provide a score and corresponding product/service. For example, if the scoring probability server 40 is being utilized by an automotive company, the scoring probability server 40 will provide the optimal moment/score to convert for a given car (e.g., Camaro).

Once the scoring has been determined and compared to the scoring threshold, as well as the site mapping, the consumer identity profile can be updated (step 440). In an aspect, the profiling and scoring application 208 can update the consumer identity profile stored in the user profile store 340 shown in FIGS. 5-6. The data of an existing profile can be modified, added to, or enriched. In an aspect, external data can be integrated into the profile. In an exemplary aspect, the profiling and scoring application 208 can be configured to incorporate the external data in the profile. In an additional aspect, calculations can be performed based on the data, the results of which can then be integrated into client defined business rules. Such calculations can be performed by the profiling and scoring application 208 or can be performed by other applications and modules at the request of the profiling and scoring application 208.

In an aspect, if an existing profile cannot be found by the profiling and scoring application 208 that corresponds with the user of the internet enabled device 20 being used and currently monitored, a new profile can be created. In addition, conversion logging (step 442) and click/event logging (444) can be performed and associated with the consumer identity profile. In an aspect, the flexible attribution application 320 can perform the conversion logging and click/event logging as the attribution application 320 is generating the corresponding event lists 312 and conversions lists 314 discussed above. In an aspect, the conversion logging (442) includes logging in a database (e.g., in the form of conversion lists 314) the conversion, if one has occurred, on a website. In an aspect, conversion can include, but are not limited to, filling a form, clicking on content, and the like. In general, a conversion can be described as taking a certain action on a website. The click/event logging (step 444) include logging in a database the clicks (e.g., in the form of event lists 312) on a web page of a site. The data includes data about the page and the visitor to the page.

Once the information has been updated (profile and the like), the scoring probability server 40 can then determine whether or not a business rule has been performed (step 450). In an aspect, a business rule is a predefined action or behavior. In an aspect, the business rule will look to the conversion log 442 to find whether or not a consumer associated with the profile performed the action or behavior. If the behavior was not performed, the scoring probability server 40 ends the process (step 452). If the behavior has been performed, the scoring probability server 40 will then determine whether or not the score of the consumer is larger than a predefined score (i.e., the threshold) (step 455). If the score of the consumer does not meet the threshold requirement, the scoring probability server 40 stops the process (step 456). However, if the score of the consumer does meet the threshold, the scoring probability server 40 creates content (e.g., creatives) (step 460). In an aspect, the scoring probability server 40 can call upon the ad delivery application 329 to deliver such content when the score provided by the profiling and scoring application 208 meets or exceeds the threshold. The content can be based upon a set of content elements. In an aspect, the content can take the form of a pop-in, voucher, or other form of content, which provide added value to the client. Once the content has been generated, the scoring probability vendor 40 supplies content to the internet enabled device 20 via the vendor server 30 to be displayed to the consumer (step 470). Upon the consumer interacting with the content the internet enabled device 20, the scoring probability server 40 can then collect more consumer data (step 480). In an aspect, the scoring probability server 40 can record the behavior of the consumer based on the interaction, if the interaction was finalized (e.g., possible conversion) as well as the information submitted by the consumer. The data about the customer/consumer can then be exported and stored in the consumer identity profile (step 490), stored in the user profile store 340. In an aspect, the data can be used to update the consumer information (i.e., cookie) on the internet enabled device of the consumer (step 495). Once completed, the scoring probability server 40 can then stop the process (step 496).

Figure 9:
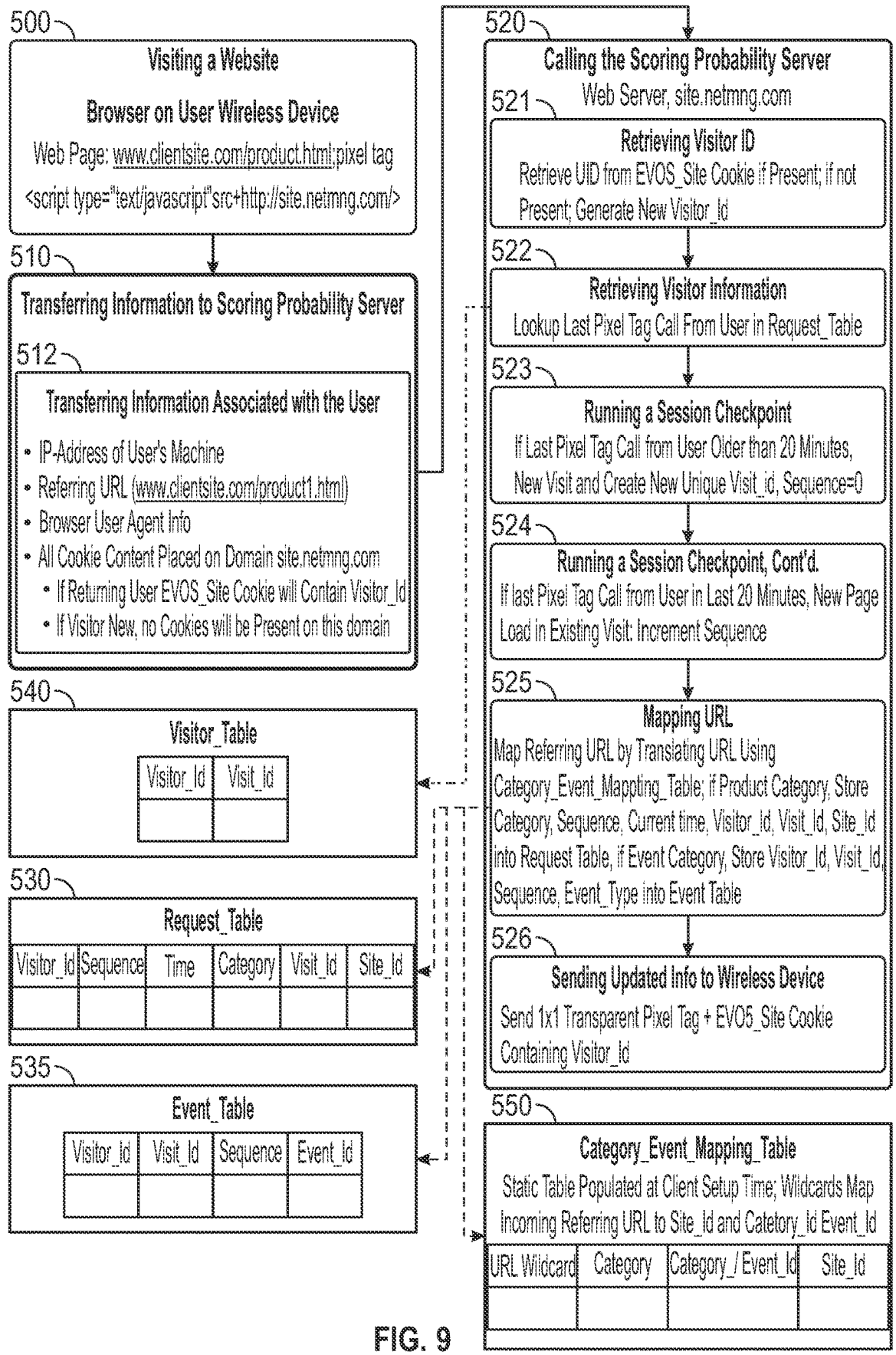
FIG. 9 is a flow diagram of a method performed by the system of FIG. 1, according to various embodiments of the present disclosure.

FIG. 9 illustrates another process performed by the profiling and scoring probability application 208 according to an aspect. The method is triggered when a consumer utilizing an internet enabled device 20 visits a website of a vendor server 30 that utilizes the scoring probability server 40, as shown at 500. The website contains a universal tag 304 (see FIG. 6). The tag 304 will call a script, which is defined by the tag. In an aspect, the script is configured to first identify a consumer and collect information related to the consumer (e.g., the consumer identity profile and cookie). When the script is activated, information is transferred to the scoring probability server 40 (step 510). The information that is transferred includes information associated with the consumer (e.g., profile and cookie) and the website. In an exemplary aspect, the information can include the referral URL, the IP-address of the consumer, the browser agent information, and the current URL, which can be sent to the scoring probability server 40 (step 512).

Upon receipt of the information/execution of the script, the scoring probability server 40 can then call upon the scoring probability application 208 (step 520). The scoring probability application 208 can check to see if there is a corresponding cookie and profile, found in the profile store 340, containing the visitor id associated with consumer provided by the scoring probability server 40. The profiling and scoring probability application 208 can then retrieve the visitor id (step 521). If a corresponding visitor id cannot be located, the profiling and scoring probability application 208 will generate a new visitor id, which will eventually be stored in a new generated consumer identity profile and cookie set up for the visitor. If the profiling and scoring application 208 finds a corresponding visitor id, the profiling and scoring application 208 will retrieve the visitor information associated with the visitor id (step 522). Here, the profiling and scoring application 208 will look up the visitor id in the user profile store (340) and find the visitor information, if any. In an aspect, the visitor information can include session information, which includes the time of the last page request/event (i.e., a click) and a visit identifier (i.e., a visit id) of that last request/event. The visitor information can also include past segment interests and event sequences. The event sequences can include a sequence indicator that keeps track of the number of requests/events by a consumer during a session, discussed in more detail below. In an aspect, the look-up can look to a visitor table or profile store 340 (540).

Once profiling and scoring application 208 finds the last request/event associated with the consumer, the profiling and scoring application 208 will run a session checkpoint (step 523). The checkpoint looks to see if the last request/event that was processed occurred after a predetermined time period. In an exemplary aspect, the checkpoint looks to see if the last request was processed longer than 20 minutes previous. If so, a new session is created, creating a new visit id, with the sequence counter being reset to one. Otherwise, the old visit id is retained. In either case, a new page load is added. The page load can be added to the valid visit id (not more than one visit should be active at the same time), adding an increment to the sequence counter (step 524). In either aspect, the new request/event is added, which corresponds to the visiting of the URL.

Once the request/event has been added, the profiling and scoring application 208 can then map the URL (step 525). In an aspect, the mapping of the URL encompasses translating the URL to a category (e.g., product), a consumer action (e.g., visiting a gallery page, starting to fill out a form) or event (e.g., conversion). If the URL falls within a product category/interest segments (e.g., hierarchical segments, CRM configurations, consumer actions, lead generation forms and available campaign data), the profiling and scoring application 208 will store the category, the sequence leading to the category, the current time, the visitor/consumer id, visit id, and site id into a request table (530). In an exemplary aspect, one URL could be mapped to multiple categories, e.g., a product interest and a consumer action. If the mapping shows that the URL is an event category, the profiling and scoring application 208 will store the visitor/consumer id, visit id, sequence, and event type into an event table (535 or 550). In an aspect, an event category can be defined as business rules, or special actions that take place. These events are used to evaluate business rules stored and executed on the scoring probability server 40 as well as to track and evaluate the nature of the response (e.g., steps 450-470 discussed above). The events can include certain actions, such as, but not limited to, triggered, sent, shown, saved, and closed. These events then can be coupled to the creatives, tracking the progress of the interaction (e.g., did the consumer fill in the pop-in, etc.).

After the entries are made into the respective tables after the mapping, the profiling and scoring application 208 can then send a response and update the information in the cookie or set a new cookie (step 526) to the internet enabled device 20 utilized by the consumer. In an aspect, the profiling and scoring application 208 will set the cookie and send a response script (e.g., send an interaction if applicable) while saving the request information (visitor/consumer id, visit id, category, site id, time), and update the visitor information, and any other tables. In an aspect, the process discussed above does not have to be strictly separated; a creative can be sent, the consumer can interact with the creative while logging the actions of the consumer (e.g., send a response to the vendor server 30 when the consumer sees the interaction/creative).

As discussed above, the profiling and scoring application 208 is configured to generate or predict a probability of a particular consumer converting in a single score. In an aspect, the score can be generated in real time. This score is a composite of the browsing history of the consumer coupled to a set of interest categories and sentiment responses. The profiling and scoring application 208 can utilize various components to determine the score. For example, the components can include, but are not limited to, the URL (category), time between requests/events, conversion information (static), geographic location, meta-information, internal information (keyword history, display history), third party data, actions on the URL, operation system (OS). browser, time of day, day of week, and the like. In an aspect, the couplets (within and between interest categories) of the sequence of browsing history can be utilized. These transitions capture more information than single point estimates of category value by measuring two additional attributes: (1) the sustained within interest intensity of the consumer; and (2) the between interest variability and intensity of the consumer. In various embodiments, the score is based on the likelihood that the consumer would respond to a particular sentiment segment or similarity to other consumers' responses based on those sentiment categories.

In an aspect, the profiling and scoring application 208 can utilize a sequence of a consumer's browsing history to see the probability score for each of the sentiment groups. In such an aspect, it is assumed that the sequence of a consumer's browsing history represents individual exposures to various advertisements that have been coded with the various sentiment ID/acronyms and the pattern of events/positive events. It should be appreciated that positive events can include click-through, hover, discussion, conversion, or any other engagement event captured in the impression data and selected as the desired outcome. It should be appreciated that different marketers may have different desired events, may have multiple (or multiple weighted) desired events. or may have designated journeys of events. In addition, a sequence or a consumer's browsing history also represents the time spent within each exposure to the sentiments. The consumer or consumer characteristics can be primarily determined by the probabilities of conversion or any other designated positive event.

The scoring probability server 40 through the profiling and scoring application 208, can utilize a number of different approaches to determine a score for a particular sentiment group. In an aspect, the scoring system 10 can utilize a score to determine sentiment intensity. The determination does not necessarily utilize a linear model. Further, other factors like memory and aging may eventually become important and used to link this information across multiple sessions.

In an aspect, the score helps the system 10 to position the consumer in a buying decision cycle, and in his customer lifecycle, and pinpoint the content, the method and the moment of interacting with the consumer. The different scores for the various sentiments can then allow the marketer to select the best creative to place in a given advertisement placement. It should be appreciated that the advertisement placement may include an email, a SMS message, available inventory in a browser session on a webpage, or any other available place where marketer may reach an end consumer.

In some aspects, the score comprises both a static component (such as demographic) and a dynamic component (such as past engagement). The two components may be weighted differently and may factor into the scoring differently.

After all the scoring has been performed, the system can make creative selections for the available inventory matching the consumer sentiment.

The system can also back test to determine the success of the campaigns and also tune the end consumer sentiment scores. The system may find that particular characteristics are more likely to contribute to an end consumer being triggered by a particular sentiment. For example, if an end consumer is coded as being likely to have an interest in travel, such consumers may be more likely to be triggered by advertisements with a luxury or adventure seeking sentiment. Over time, however, the system may find that an interest in travel has no impact on the likely sentiment unless it is paired with an interest in luxury hotels. It should be understood that the system may find any connection or combination of consumer characteristics likely to be influenced/triggered by a set sentiment group.

Figure 10:
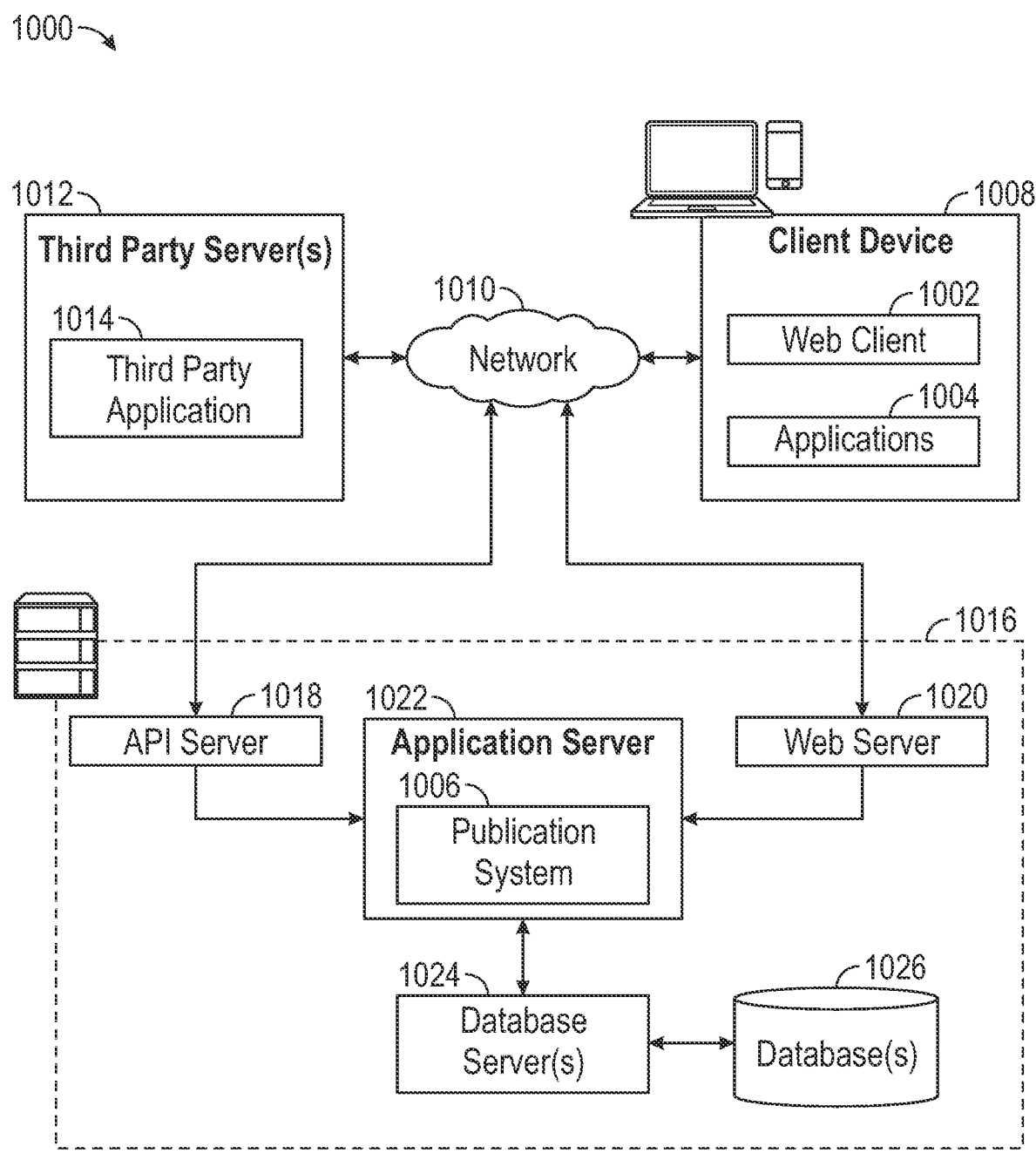
FIG. 10 is a block diagram illustrating a high-level network architecture for recommending and publishing content based on consumer sentiment predictions, according to various embodiments of the present disclosure.

With reference to FIG. 10, an example embodiment of a high-level SaaS network architecture 1000 is shown. A networked system 1016 provides server-side functionality via a network 1010 (e.g., the Internet or a WAN) to a client device 1008. A web client 1002 and a programmatic client, in the example form of a client application 1004, are hosted and execute on the client device 1008. The networked system 1016 includes an application server 1022, which in turn hosts a publication system 1006 (such as a marketing agency, an advertising exchange, or a content distributor) that provides a number of functions and services to the client application 1004 that accesses the networked system 1016. The client application 1004 also provides a number of interfaces described herein, which can present an output in accordance with the methods described herein to a user of the client device 1008.

The client device 1008 enables a consumer to access and interact with the networked system 1016 and, ultimately, the publication system 1006. For instance, the consumer provides input (e.g., touch screen input or alphanumeric input) to the client device 1008, and the input is communicated to the networked system 1016 via the network 1010. In this instance, the networked system 1016, in response to receiving the input from the consumer, communicates information back to the client device 1008 via the network 1010 to be presented to the consumer.

An API server 1018 and a web server 1020 are coupled, and provide programmatic and web interfaces respectively, to the application server 1022. The application server 1022 hosts the publication system 1006, which includes components or applications described further below. The application server 1022 is, in turn, shown to be coupled to a database server 1024 that facilitates access to information storage repositories (e.g., a database 1026). In an example embodiment, the database 1026 includes storage devices that store information accessed and generated by the publication system 1006.

Additionally, a third-party application 1014, executing on one or more third party servers 1012 (e.g., email servers hosting one or more email inboxes, web servers hosting one or more web pages having placements for advertising content, content streaming servers hosting one or more content streaming platforms having placements for media advertising, and the like), is shown as having programmatic access to the networked system 1016 via the programmatic interface provided by the API server 1018. For example, the third-party application 1014, using information retrieved from the networked system 1016, may support one or more features or functions on a website hosted by a third party.

Turning now specifically to the applications hosted by the client device 1008, the web client 1002 may access the various systems (e.g., the publication system 1006) via the web interface supported by the web server 1020. Similarly, the client application 1004 (e.g., a marketing agency "app") accesses the various services and functions provided by the publication system 1006 via the programmatic interface provided by the API server 1018. The client application 1004 may be, for example, an "app" executing on the client device 1008, such as an iOS or Android OS application to enable a consumer to access and input data on the networked system 1016 in an offline manner and to perform batch-mode communications between the client application 1004 and the networked system 1016.

Further, while the SaaS network architecture 1000 shown in FIG. 10 employs a client-server architecture, the present inventive subject matter is of course not limited to such an architecture, and could equally well find application in a distributed, or peer-to-peer, architecture system, for example. The publication system 1006 could also be implemented as a standalone software program, which does not necessarily have networking capabilities.

Figure 11:
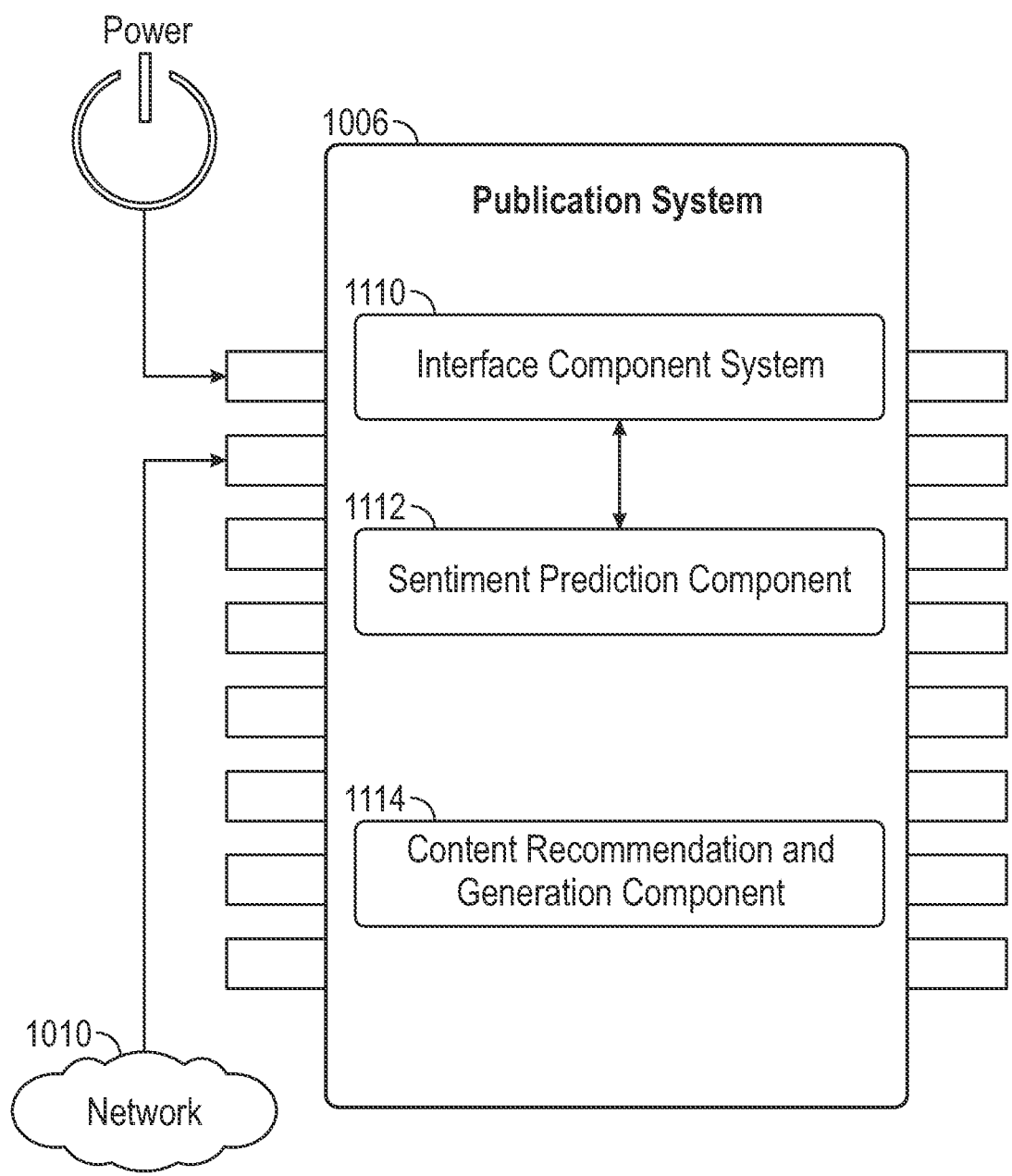
FIG. 11 is a block diagram showing architectural aspects of a targeted content publication system, according to various embodiments of the present disclosure.

FIG. 11 is a block diagram showing architectural details of a publication system 1006, according to some example embodiments. Specifically, the publication system 1006 is shown to include an interface component 1110 by which the publication system 1006 communicates (e.g., over a network 1010) with other systems within the SaaS network architecture 100.

Figure 12:
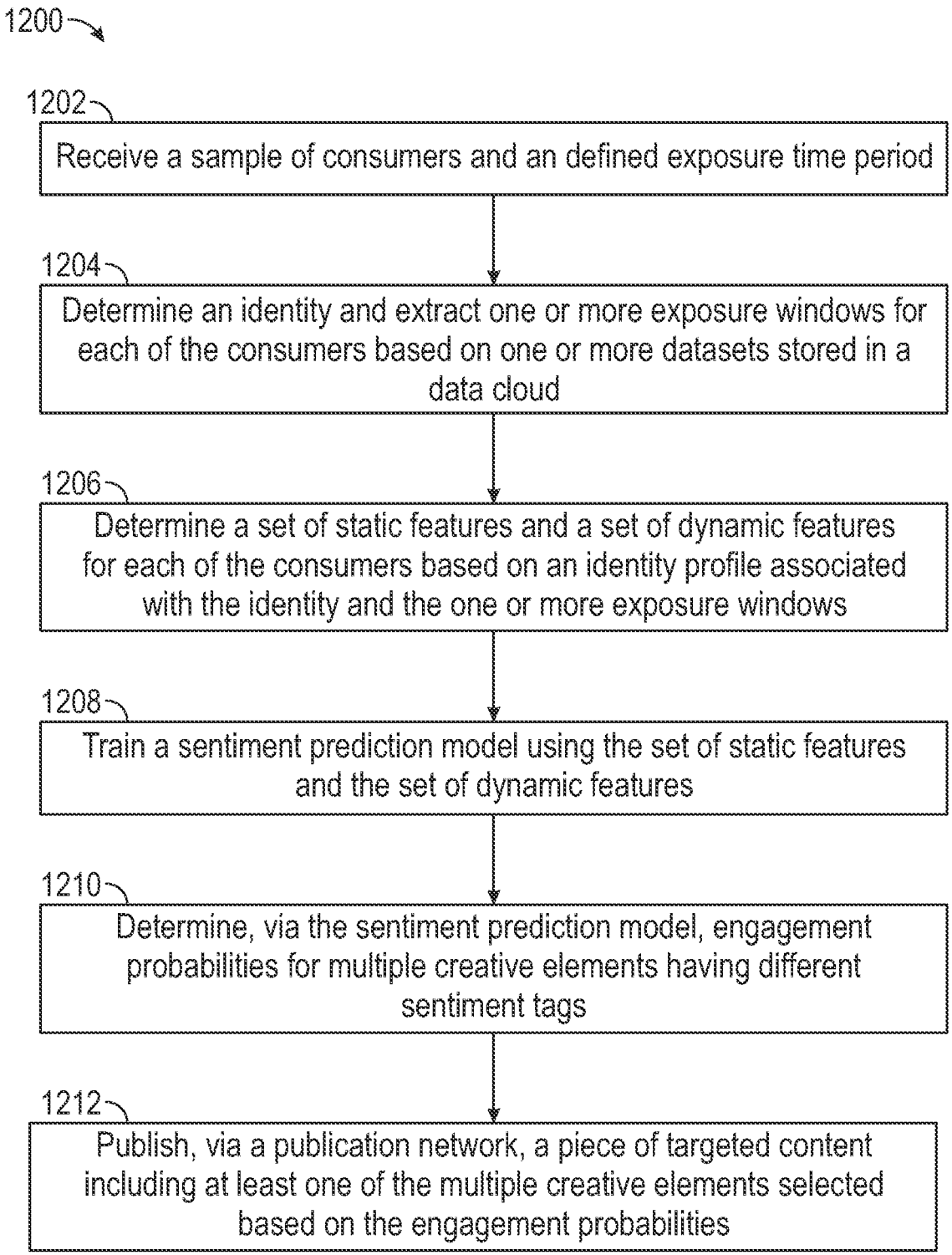
FIG. 12 is a flow chart depicting operations in a method, according to various embodiments of the present disclosure.

The interface component 1110 is communicatively coupled to a sentiment prediction component 1112 that generates consumer sentiment predictions based on static features and dynamic features as described herein. The interface component 1110 and the sentiment prediction component 1112 are also communicatively coupled to a content recommendation and generation component 1114 that recommends targeted content, selects creative elements to include in targeted content, and or generates based on the sentiment predictions provided by the sentiment prediction component 1112. In various embodiments, the interface component 1110 publishes content recommendations and or creative elements selected by the content recommendation and generation component 1114 to third party content generation systems that create targeted content using the recommendations and or selected creative elements provided by the content recommendation and generation component 1114. The interface component 1110 may also publish targeted content created by the content recommendation and generation component 1114 to one or more placements at a specific location or domain in available advertising inventory that is accessible by the consumers having a particular sentiment predicted by the sentiment prediction component 1112. Some present examples also include methods. FIG. 12 is a flow diagram illustrating example operations in a method 1200 of selecting creative elements for targeted content based on consumer sentiment analysis. At 1202, the digital publication system may receive a sample of consumers and an exposure time period. At 1204, the digital publication system may determine an identity and extract one or more exposure windows for each of the consumers based on the one or more datasets stored in the data cloud. At 1206, the digital publication system may determine a set of static features and a set of dynamic features for each consumer based on an identity profile associated with the identity and the one or more exposure windows. At 1208, the publication system may train a sentiment prediction model using the set of static features and the set of dynamic features. At 1210, the publication system may determine, via the sentiment prediction model, engagement probabilities for multiple creative elements having different sentiment tags. At 1212, the publication system may publish, via a publication network, a piece of targeted content including at least one of the multiple creative elements selected based on the engagement probabilities.

In this disclosure, the following definitions may apply in context. A "Client Device" or "Electronic Device" refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Communications Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" (also referred to as a "module") refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component includes a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A digital publication system configured to publish targeted content to online consumers, the digital publication system comprising:
   one or more processors connected to one or more datasets associated with the online consumers via a publication network; and
   a memory storing instructions that, when executed by at least one processor in the one or more processors, cause the at least one processor to perform operations comprising:
   deliver one or more pieces of targeted content each comprising at least one universal tag to one or more internet enabled devices through one or more vendor servers over an exposure time period, the one or more pieces of targeted content associated with one or more sentiments, the at least one universal tag being configured to activate a script in response to the one or more pieces of targeted content being accessed by the one or more internet enabled devices;

receive a raw event, a raw conversion, and a cookie associated with each of the one or more internet enabled devices in response to the script being activated by the at least one universal tag;

determine a set of static features based on the received cookie and a set of dynamic features based on the received raw event and raw conversion;

train a sentiment prediction model based on the one or more sentiments, the set of static features, and the set of dynamic features, the sentiment prediction model being configured to determine one or more engagement probabilities for the one or more sentiments;

determine a creative element associated with one of the one or more sentiments having an increased engagement probability based on the one or more engagement probabilities determined by the sentiment prediction model; and cause a display of the creative element on an internet enabled device via the one or more vendor servers.

2. The system of claim 1, wherein the operations further comprising:

determining an identity and one or more exposure windows associated with the one or more internet enabled devices, the one or more exposure windows including an identifier for a piece of targeted content presented to the one or more internet enabled devices, one or more sentiment tags for at least one creative element included in the piece of targeted content, a digital timestamp recording a time the piece of targeted content was presented to the one or more internet enabled devices, a defined time period indicating a temporal length of the one or more exposure windows, and a piece of impression data captured during the defined time period.

3. The system of claim 2, wherein the one or more processors is further configured to derive one or more dynamic features from impression data included in the one or more exposure windows.

4. The system of claim 2, wherein the piece of targeted content includes an email; and The one or more processors is further configured to publish the piece of targeted content by delivering the email to an email server hosting an email inbox of at least one of the one or more internet enabled devices.

5. The system of claim 2, wherein the piece of targeted content includes a display advertisement; and the one or more processors is further configured to publish the piece of targeted content by providing the display advertisement to a web server hosting a web page including one or more placements for advertising content.

6. The system of claim 2, wherein the one or more processors is further configured to select, from the one or more exposure windows, a reduced sample of exposure windows including a piece of targeted content having a particular sentiment; and train the sentiment prediction model based on a set of dynamic features derived from the reduced sample of exposure windows.

7. The system of claim 1, wherein the set of static features includes at least one of location data or at least one intender attribute for each of the one or more internet enabled devices.

8. A method of publishing targeted content to online consumers comprising:

delivering one or more pieces of targeted content each comprising at least one universal tag to one or more internet enabled devices through one or more vendor servers over an exposure time period, the one or more pieces of targeted content associated with one or more sentiments, the at least one universal tag being configured to activate a script in response to the one or more pieces of targeted content being accessed by the one or more internet enabled devices;

receiving a raw event, a raw conversion, and a cookie associated with each of the one or more internet enabled devices in response to the script being activated by the at least one universal tag;

determining a set of static features based on the received cookie and a set of dynamic features based on the received raw event and raw conversion;

training a sentiment prediction model based on the one or more sentiments, the set of static features, and the set of dynamic features, the sentiment prediction model being configured to determine one or more engagement probabilities for the one or more sentiments;

determining a creative element associated with one of the one or more sentiments having an increased engagement probability based on the one or more engagement probabilities determined by the sentiment prediction model; and causing a display of the creative element on an internet enabled device via the one or more vendor servers.

9. The method of claim 8, further comprising:

determining an identity and one or more exposure windows associated with the one or more internet enabled devices, wherein the one or more exposure windows including an identifier for a piece of targeted content presented to the one or more internet enabled devices, one or more sentiment tags for at least one creative element included in the piece of targeted content, a digital timestamp recording a time the piece of targeted content was presented to the one or more internet enabled devices, a defined time period indicating a temporal length of the one or more exposure windows, and a piece of impression data captured during the defined time period.

10. The method of claim 9, further comprising deriving one or more dynamic features from impression data included in the one or more exposure windows.

11. The method of claim 9, wherein the piece of targeted content includes an email; and the method further comprises publishing the piece of targeted content by delivering the email to an email server hosting an email inbox of at least one of the one or more internet enabled devices.

12. The method of claim 9, wherein the piece of targeted content includes a display advertisement; and the method further comprises publishing the piece of targeted content by providing the display advertisement to a web server hosting a web page including one or more placements for advertising content.

13. The method of claim 9, further comprising selecting, from the one or more exposure windows, a reduced sample of exposure windows including a piece of targeted content having a particular sentiment; and training the sentiment prediction model based on a set of dynamic features derived from the reduced sample of exposure windows.

14. The method of claim 8, wherein the set of static features includes at least one of location data or at least one intender attribute for each of the one or more internet enabled devices.

15. A non-transitory machine-readable medium comprising instructions which, when read by a machine, cause the machine to perform operations comprising:

delivering one or more pieces of targeted content each comprising at least one universal tag to one or more internet enabled devices through one or more vendor servers over an exposure time period, the one or more pieces of targeted content associated with one or more sentiments, the at least one universal tag being configured to activate a script in response to the one or more pieces of targeted content being accessed by the one or more internet enabled devices;

receiving a raw event, a raw conversion, and a cookie associated with each of the one or more internet enabled devices in response to the script being activated by the at least one universal tag;

determining a set of static features based on the received cookie and a set of dynamic features based on the received raw event and raw conversion;

training a sentiment prediction model based on the one or more sentiments, the set of static features, and the set of dynamic features, the sentiment prediction model being configured to determine one or more engagement probabilities for the one or more sentiments;

determining a creative element associated with one of the one or more sentiments having an increased engagement probability based on the one or more engagement probabilities determined by the sentiment prediction model; and causing a display of the creative element on an internet enabled device via the one or more vendor servers.

16. The non-transitory machine-readable medium of claim 15, wherein the operations further comprising:

determining an identity and one or more exposure windows associated with the one or more internet enabled devices, the one or more exposure windows including an identifier for a piece of targeted content presented to the one or more internet enabled devices, one or more sentiment tags for at least one creative element included in the piece of targeted content, a digital timestamp recording a time the piece of targeted content was presented to the one or more internet enabled devices, a defined time period indicating a temporal length of the one or more exposure windows, and a piece of impression data captured during the defined time period.

17. The non-transitory machine-readable medium of claim 16, further comprising deriving one or more dynamic features from impression data included in the one or more exposure windows.

18. The non-transitory machine-readable medium of claim 16, wherein the piece of targeted content includes an email; and the operations further comprises publishing the piece of targeted content by delivering the email to an email server hosting an email inbox of at least one of the one or more internet enabled devices.

19. The non-transitory machine-readable medium of claim 16, wherein the piece of targeted content includes a display advertisement; and the operations further comprises publishing the piece of targeted content by providing the display advertisement to a web server hosting a web page including one or more placements for advertising content.

20. The non-transitory machine-readable medium of claim 16, further comprising selecting, from the one or more exposure windows, a reduced sample of exposure windows including a piece of targeted content having a particular sentiment; and training the sentiment prediction model based on a set of dynamic features derived from the reduced sample of exposure windows.

* * * * *